US012393855B1

(12) United States Patent
Jalali et al.

(10) Patent No.: US 12,393,855 B1
(45) Date of Patent: Aug. 19, 2025

(54) CAPACITY PLANNING USING MACHINE LEARNING

(71) Applicant: Amazon Technologies, Inc., Seattle, WA (US)

(72) Inventors: Ali Jalali, Austin, TX (US); Pranesh Vyas, Austin, TX (US)

(73) Assignee: Amazon Technologies, Inc., Seattle, WA (US)

(*) Notice: Subject to any disclaimer, the term of this patent is extended or adjusted under 35 U.S.C. 154(b) by 1071 days.

(21) Appl. No.: 17/237,712

(22) Filed: Apr. 22, 2021

(51) Int. Cl.
| | |
|---|---|
| G06F 15/16 | (2006.01) |
| G06N 7/01 | (2023.01) |
| G06N 20/00 | (2019.01) |
| H04L 41/0896 | (2022.01) |
| H04L 41/147 | (2022.01) |
| H04L 41/16 | (2022.01) |
| H04L 41/5009 | (2022.01) |

(52) U.S. Cl.
CPC ............. G06N 7/01 (2023.01); G06N 20/00 (2019.01); H04L 41/0896 (2013.01); H04L 41/147 (2013.01); H04L 41/16 (2013.01); H04L 41/5009 (2013.01)

(58) Field of Classification Search
CPC ................. H04L 41/16; H04L 41/147; H04L 41/0896; H04L 41/5009; G06N 7/01; G06N 20/00
USPC ........................................................ 709/223
See application file for complete search history.

(56) References Cited

U.S. PATENT DOCUMENTS

| | | | | |
|---|---|---|---|---|
| 9,207,105 | B2* | 12/2015 | Wynter | G01D 18/002 |
| 9,207,106 | B2* | 12/2015 | Wynter | G01D 18/002 |
| 10,078,337 | B1* | 9/2018 | Yao | G05D 1/0274 |
| 10,557,713 | B1* | 2/2020 | Yao | G01C 21/3492 |
| 10,671,086 | B2* | 6/2020 | Yao | G01C 21/3492 |
| 10,816,351 | B1* | 10/2020 | Yao | G01C 21/3484 |
| 11,088,925 | B2* | 8/2021 | Bertran | G06F 16/283 |
| 11,501,247 | B1* | 11/2022 | Sahasrabudhe | G06N 20/00 |
| 11,531,917 | B1* | 12/2022 | Gasthaus | G06N 3/09 |
| 11,610,118 | B2* | 3/2023 | Ostrovski | G06N 3/092 |
| 11,853,909 | B1* | 12/2023 | O'Neil | G01C 21/3697 |
| 11,861,747 | B1* | 1/2024 | Humphries | G06N 20/00 |
| 11,868,884 | B2* | 1/2024 | Deng | G06Q 30/0241 |
| 11,887,000 | B2* | 1/2024 | Ostrovski | G06N 3/092 |
| 2015/0006110 | A1* | 1/2015 | Wynter | G01D 18/002 702/189 |
| 2015/0006111 | A1* | 1/2015 | Wynter | G01D 18/002 702/189 |
| 2019/0018426 | A1* | 1/2019 | Yao | G05D 1/0212 |

(Continued)

*Primary Examiner* — Moustafa M Meky
(74) *Attorney, Agent, or Firm* — Eversheds Sutherland (US) LLP

(57) ABSTRACT

Systems, devices, and methods are provided for training and/or inferencing capacity planning using a machine learning model. A first time series may be provided as an input to a machine learning model, which may be an Auto Regressive Integrated Moving Average (ARIMA)-based forecasting model. The machine learning model may be trained solve a conditional maximum likelihood problem by performing quantile regression. The machine learning model may forecast one or more innovations using Monte-Carlo simulations. The machine learning model may generate, as an output, a value that corresponds to an amount of computing resources that is predicted, over a second time series, to be sufficient to satisfy a threshold level of availability or quality.

20 Claims, 8 Drawing Sheets

(56) References Cited

U.S. PATENT DOCUMENTS

| | | | |
|---|---|---|---|
| 2019/0122132 A1* | 4/2019 | Rimini | G06Q 50/06 |
| 2020/0401886 A1* | 12/2020 | Deng | G06N 3/088 |
| 2022/0138504 A1* | 5/2022 | Fathi Moghadam | G06N 20/20 |
| | | | 706/12 |
| 2024/0153020 A1* | 5/2024 | Humphries | G06N 20/00 |

* cited by examiner

CAPACITY PLANNING USING MACHINE LEARNING

BACKGROUND

Capacity planning may refer to a problem in which the goal is to plan for how much capacity of various resources such as computer servers, databases, bandwidth, etc., will be needed to meet a certain quality of service in the future. While historical demand can be measured, there are many challenges involved in accurately predicting how much capacity will be needed in the future. Organizations may need to forecast demand for computing resources and availability many months or even years into the future. Developing data-driven models for capacity planning is challenging. Accordingly, there is a need for more accurate models for predicting how much capacity of various computing resources will be needed in the future.

Figure 1:
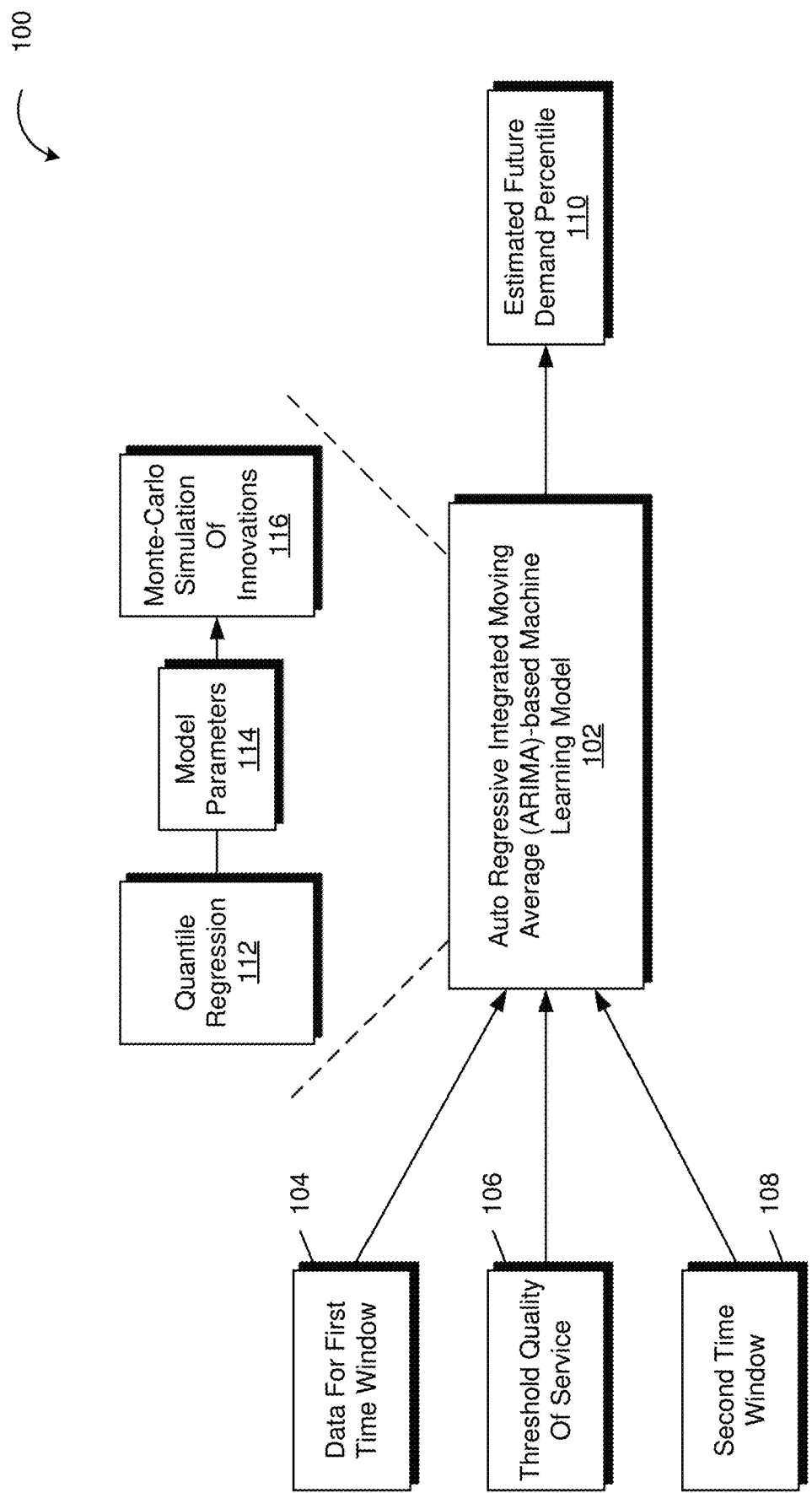
FIG. 1 illustrates a computing environment in which a machine learning model for capacity planning using quantile regression and Monte-Carlo sampling of innovations may be utilized, in accordance with one or more example embodiments of the present disclosure.

Certain implementations will now be described more fully below with reference to the accompanying drawings, in which various implementations and/or aspects are shown. However, various aspects may be implemented in many different forms and should not be construed as limited to the implementations set forth herein; rather, these implementations are provided so that this disclosure will be thorough and complete, and will fully convey the scope of the disclosure to those skilled in the art. Like numbers in the figures refer to like elements throughout. Hence, if a feature is used across several drawings, the number used to identify the feature in the drawing where the feature first appeared will be used in later drawings.

DETAILED DESCRIPTION

Machine learning can be used to achieve operational excellence. Organizations may be able to forecast and plan for future demand with a high degree of accuracy, sometimes months or years in advance. While the science community has made advancements in forecasting averages, the problem of forecasting extreme scenarios has not been examined as thoroughly. As described in greater detail below, this disclosure describes techniques which can be used for training and/or inferencing with machine learning models to perform extreme percentile forecasting. In various embodiments, an Auto Regressive Integrated Moving Average (ARIMA)-based machine learning model utilizes Quantile Regression (QR) and Monte-Carlo simulations of innovations to predict an amount of computing resources that is sufficient to provide a particular quality of service over a future time window. Innovation, in the context of time series forecasting, may refer to the difference between the observed value of a variable at time t and the optimal forecast of that value based on information available prior to time t. Proactive measures may be taken—for example, allocating and/or reserving said amount of computing resources for the specified time period. Reactive measures may be taken in addition to the proactive measures to further increase availability of computing resources for brief intervals within the time periods where the amount of computing resources proactively allocated and/or reserved is insufficient.

Capacity planning may refer to a multi-faceted problem which can be used to forecast how much capacity is required to meet a certain quality of service. Resources may refer to computing resources such as computer hardware and/or software, networking resources, and more. Capacity planning may be used to forecast whether a certain quality of service will be met in the future (e.g., years or months into the future), how much resources are needed to meet a certain quality of service, and more.

Unlike other types of forecasting problems, capacity planning may be concerned with population statistics such as percentiles across a period of time in the future rather than day-to-day accuracy. For example, an organization that hosts computing resources and provides them as a service may plan their hardware requirements in advance to be able to serve customers during seasonal surges where computing resources are in more demand. For example, if an organization hosts websites for various online retails, it may plan ahead to serve a surge in traffic during the holiday season. However, organizations may face a tradeoff between the wasted cost of unnecessary hardware prior to an expected surge in demand and the risk of poor user/customer experience (e.g., due to poor availability of services). One strategy is to proactively allocate computing resources based on a potential customer distribution. For example, an organization may allocate enough computing resources to the $95^{th}$ percentile. This percentile may refer to the how often the organization expects the allocated computing resources to meet the computing resource needs. In other words, allocating resources based on the $95^{th}$ percentile means that it is statistically expected that 5% of the time that allocated computing resources are insufficient to meet the computing resource needs (e.g., over-allocated). However, it should be noted that these percentiles are probabilistic forecasts and that there is a possibility that the demand for computing resources does not actually exceed the resources allocated to the $95^{th}$ percentile, which may be based on historical usage data. If the allocated computing resources are not sufficient to meet the client demands, reactive measures may be taken to scale up available computing resources to meet the computing resource during the 5% of the time that it is statistically expected that the proactively allocated resources are insufficient. However, there may be fewer options available to reactively allocate additional computing resources, and it may be more difficult to efficiently allocate large amounts of computing resources in a reactive manner.

Techniques described herein may relate to quantile regression-based ARIMA parameter estimation with Monte-Carlo sampling to generate demand forecasts that are more accurate than forecasts generated using other techniques. As described in greater detail below, the accuracy of models generated using techniques described herein may be more accurate for estimating demand percentile for a given risk level.

In various embodiments, techniques described herein may be utilized to predict an amount of computing resources (e.g., for a computing resource service provider) that will meet the demand for the computing resource subject at a specific percentile of a predicted demand distribution. For example, an online purchasing service may want to plan enough computer server capacity to be able to serve the surge of customers during holiday season. However, the exact number of customers is not known at the planning time and maximal planning for the absolute maximum number of customers may result in an over-allocation of computing resources, resulting in an inefficient use of computing resources which are predominantly idle. While overestimating demand may serve to increase availability of computing resources and quality of service, it may involve an increase in unnecessary cost and unnecessarily reserving or pre-allocating computing resources for a future demand that may not arise. In contrast, underestimation of the demand may result in lack of computing resources being available and poor customer performance, which may result in computing resources being unavailable, failure to process client requests, and customer dissatisfaction.

As described in greater detail below, techniques described herein may be utilized to implement systems and methods to solve the capacity planning problem using a machine learning model trained using quantile regression-based parameter estimation with Monte-Carlo sampling to generate demand forecasts. The machine learning model may be used to generate predictions of how much computing resources may be needed to meet a demand percentile over a future window of time. For example, the machine learning model may be used to forecast an amount of computing resources that a computing resource service provider will need to satisfy a certain level of quality for clients that utilize the computing resource service provider for various computing-related requests.

Quantile regression may refer to a method that targets a desired percentile of a random variable. The desired percentile may be specified at any suitable level, such as 95%, 97.5%, 99%, etc. The objective of quantile regression is to determine a set of parameters that minimizes the error by converging to the point where the desired percentile of the error mass falls below and the remaining percentile of the error falls above it. Monte-Carlo simulations may performed for innovation ensembles to improve the accuracy of the estimate future demand percentile. In at least one embodiment, Monte-Carlo sampling is performed iteratively by forecasting one step into the future at a time to get a sample from the normal distribution with the estimated innovation variance and add it to the forecast assuming full knowledge of the innovation. This process may be repeated one step at a time, over the entire time window of interest, to arrive at an estimated future demand percentile. Percentiles may be simulated over a number of runs (e.g., K times) to further refine the accuracy of the estimated future demand percentile. In at least one embodiment, several samples are collected to generate a distribution of demand percentiles, and a predicted innovation variance may be calculated from the distribution. The distribution may be organized into quartiles, quintiles, or any other suitable type of quantile. For example, averaging the $3^{rd}$ and $1^{st}$ quartiles corresponding to the $75^{th}$ and $25^{th}$ percentiles of the distribution may be selected and averaged to determine the output of the model. As discussed below in connection with FIG. 6, the average of the $1^{st}$ and $3^{rd}$ quartiles may, in at least some cases, be a more accurate prediction of the future demand percentile than the median ($2^{nd}$ quartile or $50^{th}$ percentile) of the distribution.

The above descriptions are for purposes of illustration and are not meant to be limiting. Numerous other examples, configurations, processes, etc., may exist, some of which are described in greater detail below. Example embodiments will now be described with reference to the accompanying figures.

Illustrative Processes and Use Cases

FIG. 1 illustrates a computing environment 100 in which a machine learning model for capacity planning using quantile regression and Monte-Carlo sampling of innovations may be utilized, in accordance with one or more example embodiments of the present disclosure. In at least one embodiment, computing environment 100 is implemented in the context of a computing resource service provider. Techniques described in connection with FIGS. 2-8 may be utilized in connection with FIG. 1.

In various types of forecasting problems, including capacity planning, reasonable assumptions and modifications are made to model historical demand and forecast future demand. Auto Regressive Integrated Moving Average (ARIMA) is one type of time series forecasting model that is, in various cases, suitable for weakly stationary time series. ARIMA can be used to estimate a distribution for the future forecasts. ARIMA can be used to determine this distribution, find the percentile of interest, and be used for capacity planning.

In at least one embodiment, an ARIMA-based machine learning model 102, as illustrated in FIG. 1 is used for capacity planning using quantile regression and Monte-Carlo simulation of innovations. In at least one embodiment, ARIMA-based machine learning model 102 refers to a time series forecasting model that is trained to accept, as inputs, data for a first time window 104, a threshold quality of service 106, and a second time window 108 and generate, as an output, an estimated future demand percentile 110 based on the inputs. In various embodiments, quantile regression 112 is used to determine model parameters 114, which are used in a Monte-Carlo simulation of inventions to determine a distribution of future demand percentiles, and this distribution is used to determine the estimated future demand percentile 110 illustrated in FIG. 1.

Variations of ARIMA may be used, some of which may increase the forecasting accuracy of the model. Seasonal ARIMA (SARIMA), ARIMA with exogenous variables (ARIMAX), modeling innovation variance via Generalized Auto Regressive Conditional Heteroskedasticity (GARCH), and Fuzzy ARIMA (FARIMA) are examples variations that have been used to improve forecasting accuracy under certain conditions. In some cases, ARIMA can be used to create a hybrid model by cascading ARIMA with another model. A few such models include ARIMA-ANN, ARIMA-QR, ARIMA-SVM, and ARIMA-Kalman. These models can be used for parameter estimation, including maximum likelihood with least squares.

ARIMA-based models may be designed to forecast one step into the future, as they depend on observed variables which are unknown at future times. Accordingly, long-term forecasts of ARIMA may be less reliable for solving the capacity planning model, which may involve forecasts far into the future. ARIMA-based forecasts may be designed such that they drift towards the mean of the time series. ARIMA-based models known in the art may underestimate the demand percentiles for a given risk level for one-sided percentiles. Techniques described herein may be used to overcome these shortcomings and generate more accurate models for one-sided percentiles.

In at least one embodiment, data for first time window 104 refers to a demand time series $x_1^n$ over a first time window $(1, n)$ that is known or otherwise available. The demand time series may be a historical time series. In some embodiments, the data is synthetically generated—for example, by defining parameters for a distribution and generating a plurality of data points reflective of the distribution. Synthetic data sets may be generated for training purposes, wherein a synthetic time series is generated and a first portion of the synthetic time series is provided as part of a training data set and a second portion of the synthetic time series is withheld to validate the model as part of training.

Threshold quality of service 106 may refer to a probability or percentage of time which the forecasted demand is satisfied over the second time window. For example, the threshold may refer to an r value where the empirical $r^{th}$ percentile may imply that there is a $1-r$ probability that demand exceeds capacity. For example, planning for $97.5^{th}$ percentile over a time interval may imply a statistical probability that capacity will exceed demand roughly 2.5% of the time interval. The threshold may refer to a probability, percentage, quality of service, or other suitable metric for determining capacity planning metrics. The threshold may be a predetermined value. The threshold may be an input variable that is specified when the ARIMA-based machine learning model is trained. In various cases, trade-offs exist for higher thresholds—for example, higher qualities of service may lead to better customer experience, but may result in greater amounts of computing resources being reserved even when demand does not meet the extreme demand percentile, which may result in more idle resources and lower efficiency of computing resource usage.

Second time window 108 may refer to a second time interval $(n_s, n_e)$ over which the ARIMA-based machine learning model 102 is to generate predicted demand percentiles for. In some embodiments, the first and second time windows need not be contiguous. In various embodiments, the second time window is a future time period for which the actual demand is unknown and unknowable a priori. In some embodiments, such as where synthetic data sets are utilized (e.g., for training), the second time window refer to a time period after the first time window for which data is withheld during inferencing to test the accuracy of a model that is being trained. In various embodiments, the Capacity Planning problem is described in terms of data for first time window 104, threshold quality of service 106, and second time window 108 where the data for computing resource usage in first time window is used to predict an amount of computing resources that is sufficient to meet the threshold quality of service over the second time window. The estimated future demand percentile 110 may refer to $\mathcal{P}_r(n_s, n_e)$ and may denote an amount of computing resources such as data storage capacity, storage throughput, compute resources, memory, network bandwidth, etc. that is sufficient to meet the specified threshold of quality (e.g., r-value) over a specified time window.

Figure 2:
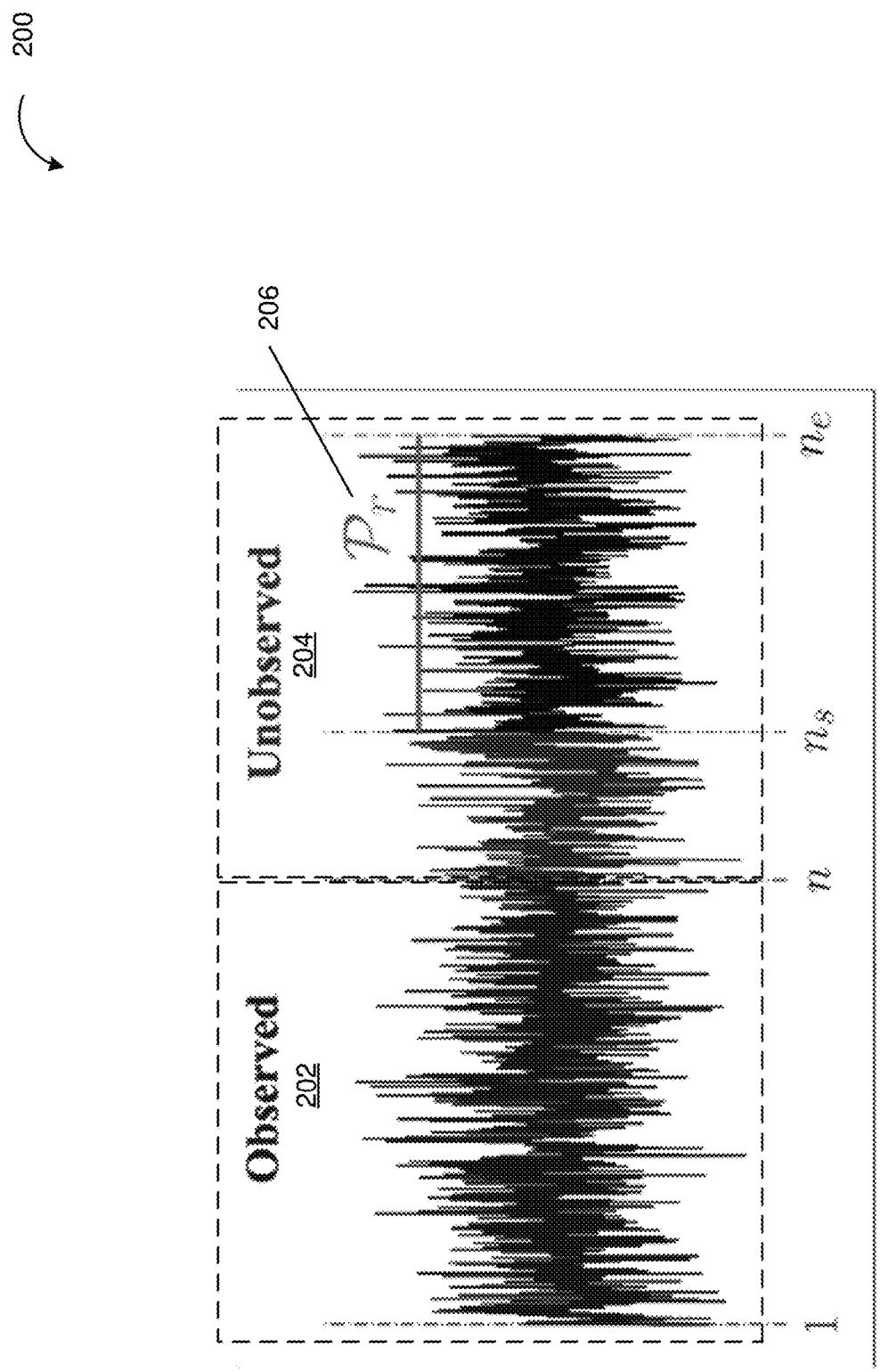
FIG. 2 illustrates a diagram depicting the Capacity Planning problem, in accordance with one or more example embodiments of the present disclosure.

FIG. 2 illustrates a diagram 200 depicting the Capacity Planning problem, in accordance with one or more example embodiments of the present disclosure. In order to estimate the distribution of the demand for a future time, historical trends of demand may be utilized to try and project those trends into the future. Furthermore, there are always unobserved factors that impact the demand both historically and in the future. The impact of these factors may also need to be appropriately modeled. This process can be used to determine a predicted distribution for a single point $t_i$ in the future—however, capacity planning may involve forecasting demand for a time interval in the future from $t_i$ to $t_j$ where $j>i$. The Capacity Planning Problem, in at least one embodiment, is defined in the following manner:

Capacity Planning Problem): Given a historical demand time series $x_i^n$ and a tolerable risk level r for a period of $n_s$ to $n_e$ into the future. Suppose the time series takes values $x_{n+1}^{n+n_e}$ in the future (which is unknown) and the empirical $r^{th}$ percentile of the values of $x_{n+n_s}^{n+n_e}$ (over the window of $n_s$ to $n_e$) is $\mathcal{P}_r$. The capacity planning problem may involve estimating the future demand percentile $\mathcal{P}_r(n_s, n_e)$ and plan for it.

As shown in FIG. 2, at least a portion of a demand time series is illustrated. An observed portion 202 of the demand time series may comprise a set of data points where demand—for example, aggregate usage of a computing resource by a set or subset of users in a computing resource service provider—is known or otherwise available. In some cases, the observed time series refers to historical demand which may be recorded in real-time or near real-time. The unobserved portion 204 may refer to the future demand which is unknown. The time window of interest for forecasting (time window of $n_s$ to $n_e$) may be at some later point in time $n_s>n$. Conversely, in some cases, $n_s=n$, in which case the time window of interest for forecasting immediately follows the observed portion (not illustrated in FIG. 2). The goal of the capacity planning problem, in at least one embodiment, involve estimating the future demand percentile $\mathcal{P}_r$ 206 over the time window of $n_s$ to $n_e$ such that r-percent of the future demand distribution fall under $\mathcal{P}_r$ and the remaining $1-r$ percent falls above $\mathcal{P}_r$.

In various embodiments, planning capacity based on the empirical $r^{th}$ percentile may imply that there is a $1-r$ probability that demand exceeds capacity. For example, planning for $97.5^{th}$ percentile over a time interval may imply a statistical probability that capacity will exceed demand roughly 2.5% of the time interval. In various embodiments, reactive measures can be adopted in response to demand exceeding resources allocated based on the empirical $r^{th}$ percentile. An example of a reactive measure may be a queuing mechanism whereby an online purchasing platform limits the number of users that can concurrently browse the website to a maximum number and queues up excess users at a waiting page. As a second example, a reactive measure may involve a queueing mechanism where client requests of a computing resource service provider are submitted to a queue (e.g., first-in-first-out data structure) along with requests from other users such that when resources are freed (e.g., as a result of a request being processed) that requests are retrieved from the front of the queue and then processed with the computing resources that were just made available. As yet another example, a reactive measure may involve scaling up of resources in a computing resource service provider to provide addition computing resources.

In some embodiments, the accuracy of the prediction of each time index in a time interval is of little or no importance, but rather, estimations of the collective behavior of the time series within a time interval of interest in the futures are used for capacity planning. This is in contrast to various forecasting algorithms that are configured to minimize point-wise error (on average). This is a key difference in the capacity planning problem addressed herein as compared to other forecasting problems.

Auto Regressive Moving Average (ARMA) may be defined as given below. First, a time series $x_1, x_2, \ldots, x_n$ may be represented as $x_1^n$ where subscripts denote time indices. Without loss of generality, the observed part of the time series may start from index 1 and end at index n. Further, the time series may be assumed to be weakly stationary in the sense that with some differentiation process (as discussed in greater detail below), the time series becomes stationary. In various embodiments, the long-term trend of the timer series is a polynomial.

Thus, given a stationary zero-mean time series $x_1^n$, then $x_i$ can be modeled for i>n as:

ARMA(p, q): Given a stationary zero-mean time series $x_1^n$, $x_i$ for i>n can be modeled as $$x_i = \mu_i + u_i \quad (1)$$

$$\mu_i = \sum_{j=1}^{p} \phi_j x_{i-j} - \sum_{k=1}^{q} \theta_k u_{i-k}$$

$$u_i \sim \mathcal{D}(0, \sigma^2)$$

where $u_i$'s are i.i.d. samples drawn from the distribution $(0, \sigma^2)$, and $\theta$'s, $\sigma$'s, and a are the model parameters. Equivalently, ARMA may also be represented as:

$$x_i \sim \mathcal{D}(\mu_i, \sigma_i^2) \quad (2)$$

$$\mu_i = \sum_{j=1}^{p} \phi_j \mu_{i-j} - \sum_{j=1}^{p} \phi_j u_{i-j} - \sum_{k=1}^{q} \theta_k u_{i-k}$$

$$\sigma_i^2 = \sigma^2$$

This representation formulates the evolution of the mean of the distribution while keeping the variance constant. It models the time series as samples drawn from the distribution with the mean of $\mu_i$ and constant standard deviation of $\sigma$.

For a stationary time series $x_1^n$, an auto-ARIMA process can be used to optimize parameters p and q. This optimization process may be separate from (e.g., independent of) the techniques used for estimating other parameters $\phi$, $\theta$, and $\sigma$. As described throughout this disclosure, p and q may be determined in any suitable manner.

Let the following algorithm describe a differentiation process in at least one embodiment:

ARIMA(p, d, q): given a non-stationary time series $x_1^n$, and supposing that the differentiation process is applied d times to get a stationary time series $y_1^{n-d}$, then:

$$\text{ARIMA}(p, d, q)(x_1^n) = \text{ARMA}(p, q)(y_1^{n-d}) \quad (3)$$

where ARMA may defined as discussed above. In at least one embodiment, the differentiation process may be in accordance with the following:

Example Differentiation Process

Diff(x, d)
if d≤0 then
   return x
for i from 1 to x.length−1 do $y_i = x_{i+1} - x_i$ return Diff(y, d−1)

Based on this definition, by doing a pre-processing on the time series, an ARIMA model can be reduced to an ARMA model. In various embodiments, stationary tests such as KPSS, ADF, PP, and ADF-GLS can be used to determine the value of d. Once d is determined, one can run the differentiation process and reduce the problem to parameter estimation for the ARMA model.

In various embodiments, seasonality with periodicity of m is defined to be a consistent pattern that can be seen in a time series $x_1^n$ by considering any sub-series of the form $x_i$, $x_{i+m}$, $x_{i+2m}$, where $i \in \{1, 2, \ldots, m-1\}$. For example, if $x_i$ represents daily numbers and m=7 (e.g., weekly patterns), then $x_1, x_8, x_{15}, \ldots$ represent the sequence of Sundays and $x_2, x_9, x_{16}, \ldots$ represent the sequence of Mondays, etc.

SARMA(p, q)(P, Q)(m): given a stationary zero-mean time series $x_1^n$ with seasonal periodicity of m, $x_i$ for i>n may be modeled as:

$$x_i = \mu_i + u_i \quad (4)$$

$$\mu_i = \sum_{j=1}^{p} \phi_j x_{i-j} + \sum_{l=1}^{p} \Phi_l x_{i-lm} - \sum_{j=1}^{p}\sum_{l=1}^{p} \phi_j \Phi_l x_{i-j-lm}$$

$$- \sum_{k=1}^{q} \theta_k u_{i-k} - \sum_{v=1}^{Q} \Theta_l u_{i-vm} - \sum_{k=1}^{q}\sum_{v=1}^{Q} \theta_k \Theta_v u_{i-k-vm}$$

$$u_i \sim \mathcal{D}(0, \sigma^2)$$

where $u_j$'s are i.i.d. samples drawn from the distribution $(0, \sigma^2)$, and $\phi$'s, $\Phi$'s, $\theta$'s, $\Theta$'s, and $\sigma$ are the model parameters.

In contrast to ARMA, SARMA has additional terms to capture seasonality. It is noted, however, that the presence of these terms breaks the linearity of $\mu_i$ in model parameters. However, the fact that given $\theta$'s and $\phi$'s, the $\mu_i$ is linear in $\Theta$'s and $\Phi$'s and vice versa can be leveraged.

SARIMA(p, d, q)(P, D, Q)(m)($x_1^n$): given a non-stationary time series $x_1^n$ with seasonal periodicity of m, suppose a seasonal differentiation process is applied D times (e.g., via Algorithm 2) followed by the application of the differentiation process d times (e.g., via Algorithm 1) to get a stationary time series $y_1^{n-d-mD}$, then:

$$SARIMA(p, d, q)(P, D, Q)(m)(x_1^n) \quad (5)$$
$$= SARMA(p, q)(P, D, Q)(m)(y_1^{n-d-mD})$$

In at least one embodiment, a seasonal differentiation process may be in accordance with the following:

Example Seasonal Differentiation Process

SeasonalDiff(x, D, m)
if d≤0 then
    return x
for i from 1 to x.length−m do $$y_i = x_{i+m} - x_i$$

return SeasonalDiff(y, D−m, m)

Similar to the ARIMA case, SARMA may be utilized instead of SARIMA given that the appropriate pre-processing (differentiation) has taken place. Furthermore, it may be assumed that parameters p, q, P, and are known (e.g., via an auto-ARIMA process). The choice of the parameter m may be done either via domain knowledge about the time series—for example, the demand has a weekly trend (m=7) or the temperature has an annual trend (m=365). In the absence of domain knowledge, one can use Fourier transforms to find the domain frequencies of the time series and determine m based on that. In at least some embodiments, the parameter m is assumed to have been determined using any suitable processes, such as the examples described above.

In various embodiments, ARMA model assumes a fixed innovation variance of $\sigma^2$. In various embodiments, some time series may not fit into this criteria as the innovation variance might change from one point to another. Auto Regressive Conditional Heteroskedasticity (ARCH) and its variations are a class of models that model the evolution of variance across samples (in contrast to ARMA model that captures the evolution of the mean across samples).

GARCH(r, s): given a time series $x_1^n$ where $x_i$ is modeled for i>n as:

$$x_i \sim D(\mu_i, \sigma_i^2) \quad (6)$$
$$\mu_i = \mu$$
$$\sigma_i^2 = \omega + \sum_{j=1}^{r} \alpha_j \sigma_{i-j}^2 - \sum_{k=1}^{s} \beta_k u_{i-k}^2$$
$$u_i = x_i - \mu_i$$

where $\alpha$'s, $\beta$'s, and $\omega$'s are model parameters.

In at least some embodiments, combining GARCH as defined above with ARMA as defined in (2) can capture the evolution of mean and variance of the distribution at the same time. These definitions can be extended to the ARIMA and seasonal cases. This combination may be formalized in the following manner, according to at least one embodiment:

ARMA(p, q)-GARCH(r, s): given a stationary time series $x_1^n$, $x_i$ for i>n may be modeled as:

$$x_i \sim D(\mu_i, \sigma_i^2) \quad (7)$$

$$\mu_i = \sum_{j=1}^{p} \phi_j \mu_{i-j} - \sum_{j=1}^{p} \phi_j u_{i-j} - \sum_{k=1}^{q} \theta_k u_{i-k}$$

$$\sigma_i^2 = \omega + \sum_{j=1}^{r} \alpha_j \sigma_{i-j}^2 - \sum_{k=1}^{s} \beta_k u_{i-k}^2$$

$$u_i = x_i - \mu_i$$

Various techniques may be utilized for estimating the parameters of the models described herein. These methods may be categorized into a few groups with differing capabilities and limitations. While the discussion in this disclosure focuses on two-step regression and maximum likelihood estimation, the concepts described herein may be generalized to other methods and is not to be considered limitative in nature. Furthermore, the parameter estimation for ARMA(p, q) model with distribution being normal distribution may be considered for ease of notation, which, again, merely serves as an illustrative example which can be generalized to other models.

A challenge of parameter estimation for these models arises from the fact that the innovations $u_i$'s are not observed. Different methods may need to either explicitly or implicitly, iteratively or statically estimate these unobserved variable. Innovation, in the context of time series forecasting, may refer to the difference between the observed value of a variable at time t and the optimal forecast of that value based on information available prior to time t. Once an estimate for the unobserved variables is determined, the models introduced above are some form of linear regression (or bilinear regression). In various embodiments, techniques described herein are to perform this linear regression using different criteria to address the capacity planning problem.

A two-step regression method may be described below. In this method, the innovations $u_i$'s are assumed to be all zero and perform a regression on $x_1^n$ by using the capacity planning problem to get an ordinary least squares estimate for $\hat{\phi}$'s from the system of n−p equations:

$$x_i = \sum_{j=1}^{p} \hat{\phi}_j x_{i-j} \forall i \in \{p+1, p+2, \ldots, n\} \quad (8)$$

Then, the unobserved innovations can be estimated $$u_i = x_i - \sum_{j=1}^{p} \hat{\phi}_j x_{i-j}.$$

Finally, using $x_i$'s and $u_i$'s, a second ordinary least square may be computed to estimate $\phi$'s and $\theta$'s from the system of n−max (p, q) equations $$x_i = \sum_{j=1}^{p} \phi_j x_{i-j} - \sum_{k=1}^{q} \theta_k u_{i-k} \forall i \in \{\max(p, q)+1, \ldots, n\} \quad (9)$$

Subsequently, the parameter theta can be estimated by $$\hat{\sigma}^2 = \frac{1}{n - \max(p, q) - 1} \sum_{i=\max(p,q)+1}^{n} u_i^2 \quad (10)$$

This method may be performant in terms of run time and easy to understand, but may not be as accurate or robust under certain conditions.

Methods of moments may be used to find a distribution that matches for moments of the data. For example, the Yule-Walker algorithm may be used to estimate the moments of the time series. The parameters of the ARMA model can then be estimated by solving non-linear system of equations that ties them to the moments. This method may be computationally intense and it might not converge under certain conditions to the extent that some researchers suggested this method should not be used for ARMA parameter estimation.

Maximum likelihood maximized the likelihood function for the distribution $\mathcal{D}$ to find the optimal parameters of the ARMA model. Conditioned the first max (p, q) elements of the time series (e.g., $x_1^{max\,(p,q)}$), the joint probability density function of $x_1^n$ may be written as:

$$f(x_1^n;\ \phi,\ \theta,\ \sigma) = f(x_1^{max\,(p,q)};\ \phi,\ \theta,\ \sigma) f_{(x_{max\,(p,q)+1}^n | x_1^{max\,(p,q)};\ \phi,\theta,\sigma)} \quad (11)$$

Where, f(•) represents the probability density function. Accordingly, the log-likelihood function may be written as:

$$\mathcal{L}(x_1^n;\phi,\theta,\sigma) = \underbrace{-\log\left(f\left(x_1^{max(p,q)};\phi,\theta,\sigma\right)\right)}_{\overset{\Delta}{=}\mathcal{L}_m\left(x_1^{max(p,q)};\phi,\theta,\sigma\right)} \underbrace{-\log\left(f\left(x_{max(p,q)+1}^n | x_1^{max(p,q)};\phi,\theta,\sigma\right)\right)}_{\overset{\Delta}{=}\mathcal{L}_c(x_1^n;\phi,\theta,\sigma)} \quad (12)$$

Where $\mathcal{L}(\bullet)$ represents the negative log likelihood function, $\mathcal{L}_c(\bullet)$ represents the conditional negative log likelihood function, and $\mathcal{L}_m(\bullet)$ represents the marginal negative log likelihood function. In at least one embodiment, $\mathcal{D}$ is a normal distribution and the conditional maximum likelihood estimation of ARMA model involves minimizing the conditional least squares, for example, as follows:

$$\min \mathcal{L}_c(x_1^n;\phi,\theta,\sigma) \sim \min S_c(x_1^n;\phi,\theta,\sigma) \quad (13)$$

$$= \min_{\phi,\theta} \sum_{i=max(p,q)}^n \left(x_i - \sum_{j=1}^p \phi_j x_{i-j} - \sum_{k=1}^q \theta_k u_{i-k}\right)$$

And $\sigma$ can be estimated via (10). In order to solve (13), one can use the iterative method of Algorithm 3, an illustrative example of which is described below:

Example to Solve Conditional Maximum Likelihood

ConditionalMLE(x, p, q)
Solve system of equations $$x_i = \sum_{j=1}^p \hat{\phi}_j x_{i-j}, \forall i \in \{p+1, \ldots, 2p\}$$

to get $\hat{\phi}$'s
Initialize $u_i$=0, $\forall i \in \{1, \ldots, p\}$ and $$u_i = x_i - \sum_{j=1}^p \hat{\phi}_j x_{i-j}, \forall i \in \{p+1, \ldots, n\}$$

while Not Converged do
Regress via least squares:

$$x_i = \sum_{j=1}^p \phi_j x_{i-j} - \sum_{k=1}^q \theta_k x_{i-k}, \forall i \in \{max(p,q)+1, \ldots, n\}$$

Update $$u_i = x_i - \sum_{j=1}^p \phi_j x_{i-j} - \sum_{k=1}^q \theta_k k_{i-k}, \forall i \in \{1, \ldots, n\}$$

return $\phi$ and $\theta$

Characterizing $\mathcal{L}_m(\bullet)$ may be done by writing each $x_i$ for $1 \le i \le max$ (p, q) as an infinite sum of innovations $u_j$ and finding the covariance matrix of $x_i, \ldots x_{max(p,\,q)}$. In at least one embodiment, $\mathcal{L}(\bullet)$ and $\mathcal{L}_c(\bullet)$ exhibit the same asymptotic behavior—in other words, for sufficiently large values of n, one can optimize $\mathcal{L}_c(\bullet)$ and skip the full likelihood function.

The two-step regression and conditional maximum likelihood methods are least square optimizations at their core. These methods can be extended to seasonal and GARCH versions of ARIMA, as they have a similar structure. For the case of seasonality, the least square problem becomes a bilinear problem that can be solved by alternating between the parameters as described earlier.

In at least one embodiment, techniques described herein relate to ARIMA parameter estimation using Quantile Regression (QR) to solve the Capacity Planning Problem (e.g., as described in Definition 1). ARIMA-based models, such as the variants discussed above, may be considered good candidates to model the historical and future demands for the Capacity Planning Problem, because they account for unobserved factors in the modeling and, if necessary, are capable of handling the evolution of mean and variance of these latent factors over time. In fact, the optimality of ARMA for stationary time series is established by Wold's Decomposition Theorem and as long as the non-stationarity of the time series is polynomial, the differentiation process of ARIMA can convert it to a stationary process.

In some embodiments, an ARIMA-based model forecasts the standard deviation $\delta$ of innovations $u_i$. Assuming the distribution of innovations is a normal, one can use the error function to compute the desired percentile. For example, if r=97.5%, then $r \approx \hat{x}_i + 2\hat{\sigma}$ at any point i. However, one issue with this method is that while ARMA is optimal to forecast a single point into the future, its long term forecast drifts towards the mean of the time series (that is modeled by the intercept in the model). This happens mainly because there is no way to estimate the unobserved innovations $u_i$ during forecasting other than replacing them with the best blind estimate which is the mean of the distribution —i.e., zero. Hence, after q step forecasts the Moving Average (MA) part of the model becomes zero. Subsequently, since the Auto Regressive (AR) part is stable, it drifts towards the zero and the forecast becomes the constant in the mode—i.e., the intercept. Now, since $r$ just a constant away from this forecast and one-sided percentiles are of interest for the Capacity Planning Problem, this phenomenon results in under-estimation of the target parameter $r$.

In the case of ARIMA or other variations of ARMA, depending on the value of d, the forecast becomes polynomial. For example, if d=1, the forecast becomes a straight line with a constant slope. The slop is equal to the intercept in the underlying ARMA model. Again, due to the fact that the Capacity Planning problem deals with one-sided percentiles, this method will under-estimate $\hat{\mu}_p$ in long term forecasting.

In various embodiments, machine learning models described herein utilize techniques to perform ARMA parameter estimation with quantile regression and/or simulate innovations during the forecasting process using Monte-Carlo sampling. These two ingredients are first discussed separately, and then integrated together. In various embodiments, a machine learning model described herein utilized any suitable combination of quantile regression and Monte-Carlo simulations of innovations, including embodiments where one (but not the other) is utilized as well as embodiments in which both techniques are utilized in combination with each other.

The least squares method for ARMA parameter estimation aims to minimize the average of the square of errors. If the mean of the time series is considered as a random variable, then the least squares converges to the $50^{th}$ percentile of that random variable. This value i.e., the intercept, is what the ARMA forecast drifts towards, as discussed above. Now, when $2\hat{\sigma}$ is added to the intercept to get to the $97.5^{th}$ percentile, in half of the realizations, this falls short of the true $97.5^{th}$ percentile. If, instead of the $50^{th}$ percentile for the intercept, there were a way to estimate $97.5^{th}$ percentile of the intercept and then add $2\hat{\sigma}$ to this new mean, which would reach closer to the true $97.5^{th}$ percentile.

Quantile regression 112 is a method that can be utilized to target a desired percentile of a random variable (as opposed to $50^{th}$ percentile with least squares) The objective of this quantile regression is:

$$\min_{\phi,\theta} \sum_{i=\max(p,q)}^{n} \rho_r\left(x_i - \sum_{j=1}^{p}\phi_j x_{i-j} - \sum_{k=1}^{q}\theta_k x_{i-k}\right) \quad (14)$$

where $\rho_r(\cdot)$ is defined as $$\rho_r(z)=(1-r)\max(z, 0)+r\max(-z, 0) \quad (15)$$

This minimization converges to the point where r percentile of the error mass falls below and $1-r$ percentile of the error falls above it. Quantile regression may be used to target a desired threshold of quality over a given time window.

During forecasting procedure using ARIMA model, the first next step is forecasted using the historical data, but after that, the unobserved innovations $u_i$'s are all assumed to be zero and practically remove the MA part of the ARMA. Since Capacity Planning Problem is impacted by the long-term population statistics and is not directly impacted by the point accuracy of the forecasts, innovations can be simulated based on the estimated $\hat{\sigma}$.

The modified forecasting process works as follows: first, forecast one step into the future; then, get a sample from the normal distribution with estimated $\hat{\sigma}$ and add it to the forecast assuming full knowledge of the innovation $u_i$. Then, continue the forecasting process, one step at a time, as explained to reach $n_e$. Continue by repeating this whole process multiple times to get a better estimate of $\hat{\mu}_p$ over the simulated time series. Techniques for simulating model accuracy may be discussed in connection with FIG. 6.

Figure 6:
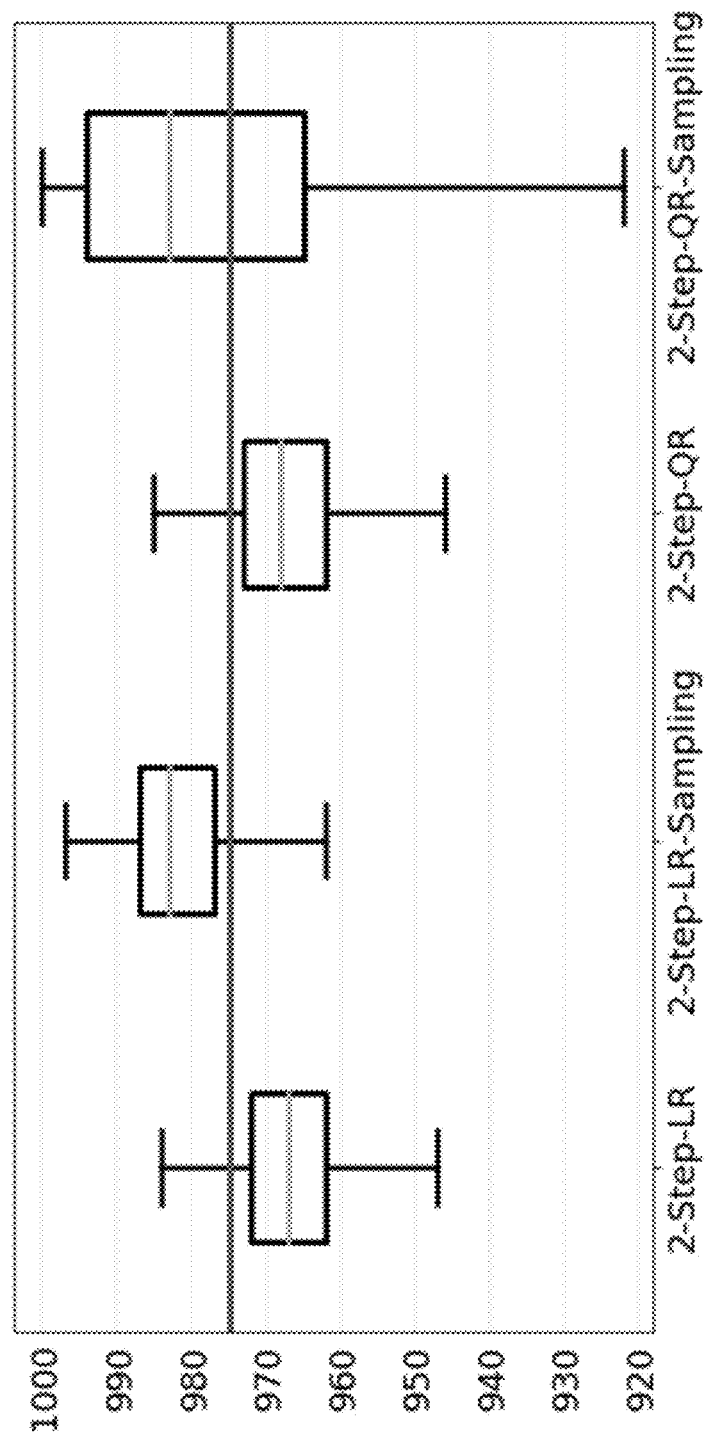
FIG. 6 illustrates a diagram that compares accuracy of various models using synthetic data sets, in accordance with at least one embodiment.

Putting the two ingredients together, in at least one embodiment, ARMA parameter estimation is performed by using quantile regression and performing Monte-Carlo simulation 116 for innovation ensembles (e.g., K times) to get an accurate estimate of $\hat{\mu}_p$. In at least one embodiment, the average of the $3^{rd}$ and $1^{st}$ quantiles of the simulated percentiles is the selected as the candidate solution value to the Capacity Planning problem. FIG. 6 illustrates how the average of the $3^{rd}$ and $1^{st}$ quantiles may be a suitable solution, in at least some embodiments. In some embodiments, the median is selected as the estimate of $\hat{\mu}_p$. In at least one embodiment, Algorithm 4 describes techniques for solving the Capacity Planning problem using quantile regression and Monte-Carlo simulation for innovations:

Example to Solve Capacity Planning Problem

Figure 3:
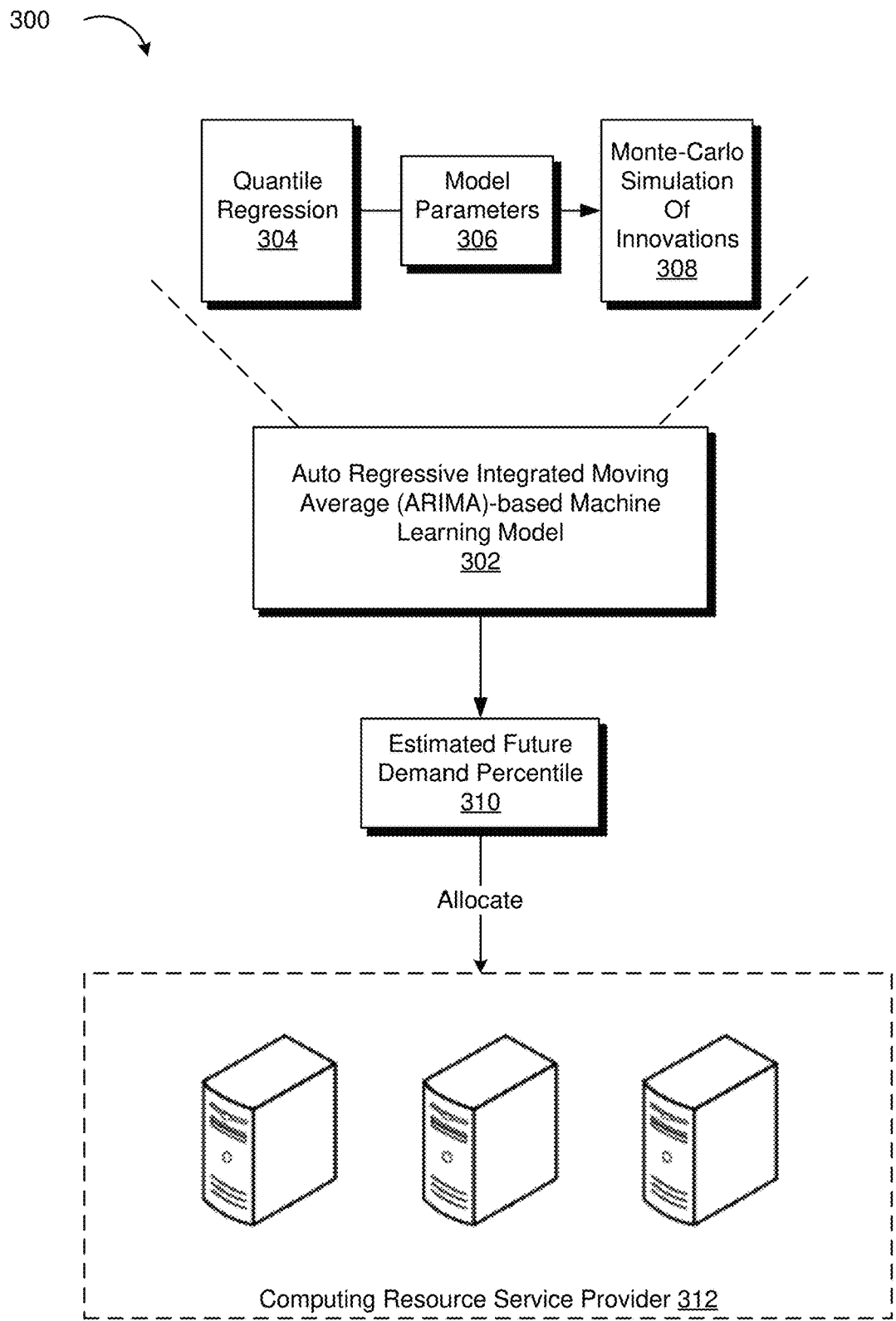
FIG. 3 illustrates a computing environment in which computing resources are proactively allocated based on estimated demand generated by a machine learning model for capacity planning using quantile regression and Monte-Carlo sampling of innovations, in accordance with one or more example embodiments of the present disclosure.

CapPlan(x, p, q, r, K)
Replace least squares with quantile regression in Algorithm 3
for i from 1 to K do
    Forecast ARIMA time series for $n_e-n$ steps
    Compute and stores of $\hat{\mu}_r$ of $x_i$ for $i \in \{n_s, \ldots, n_e\}$
return Average of $3^{rd}$ and $1^{st}$ quantile of $\hat{\mu}_r$'s FIG. 3 illustrates a computing environment 300 in which computing resources are proactively allocated based on estimated demand generated by a machine learning model for capacity planning using quantile regression and Monte-Carlo sampling of innovations, in accordance with one or more example embodiments of the present disclosure. FIG. 3 illustrates an ARIMA-based machine learning model 302, such as those described in connection with FIG. 1. ARIMA-based machine learning model 302 may use quantile regression 304 to determine values for one or more model parameters 306 such as parameters $\phi$, $\theta$, and $\sigma$. These model parameters may be used to perform Monte-Carlo simulations 308 for innovations over the time window of interest, which may be used to generate an estimated future demand percentile 310. Techniques described elsewhere, such as those discussed in connection with FIGS. 1 and 7, may be utilized in the context of FIG. 3. Estimated future demand percentile 310 may refer to an amount of computing resources, such as servers, compute power, memory, data storage capacity, network bandwidth, etc. that is predicted to be needed to satisfy a specified level of quality over a future time window. Computing resource service provider 312 may proactive allocate resources to match the amount of computing resources specified by ARIMA-based machine learning model 302, striking a balance between providing high availability while also not over-allocating for the possibility of extremely rare events.

Computing resource service provider 312 may refer to a service provider with various computing resources that are made available to clients. Clients may utilize various resources, including but not limited to servers, compute power, memory, data storage capacity, network bandwidth, etc. Estimated future demand percentile 310 may be used to determine an amount of a computing resource to proactively allocate prior to the start of the second time window. For example, resources such as storage resources may be proactively procured, reserved, allocated, etc. prior to the start of the forecast time window. In some cases, an organization may purchase additional electronic hardware or service capacity in order to reach the specified amount of computing resources. Once the computing resources have been allocated, additional resources may be reactively allocated in response to demand exceeding the proactively allocated amount, which may be described in more detail below, in connection with FIG. 4.

Figure 4:
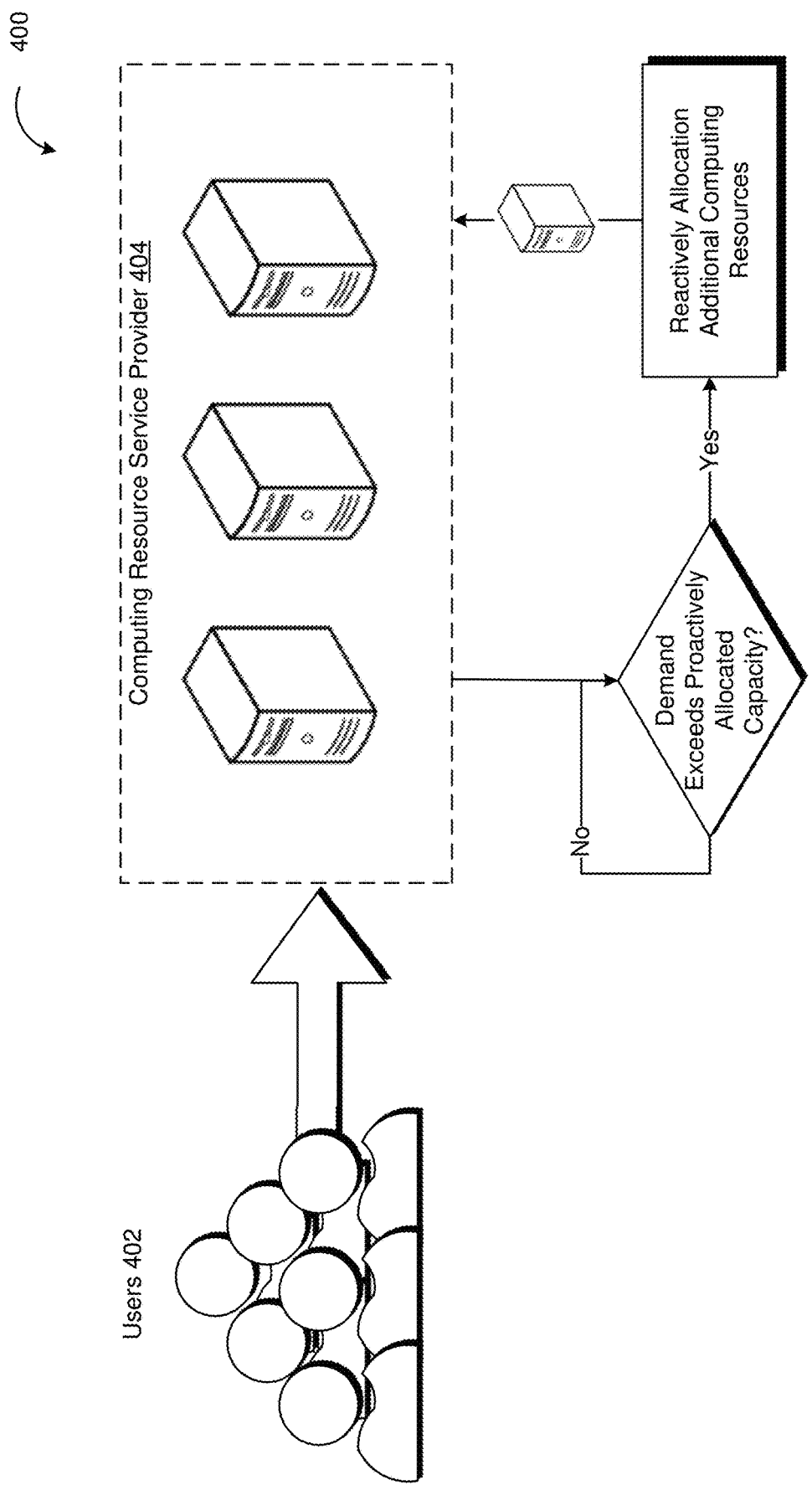
FIG. 4 illustrates a computing environment in which computing resources are reactively allocated in response to user demand exceeding an amount of proactively allocated computing resources estimated by a machine learning model for capacity planning using quantile regression and Monte-Carlo sampling of innovations, in accordance with one or more example embodiments of the present disclosure.

FIG. 4 illustrates a computing environment 400 in which computing resources are reactively allocated in response to user demand exceeding an amount of proactively allocated computing resources estimated by a machine learning model for capacity planning using quantile regression and Monte-Carlo sampling of innovations, in accordance with one or more example embodiments of the present disclosure. Users 402 may refer to computing clients of computing resource service provider 404. In some embodiments, computing resource service provider 404 is provisioned with an amount of resources that corresponds to an estimated future demand percentile, as discussed in connection with FIG. 3. Subsequent to the allocation of such computing resources, demand for resources by users 402 may rise beyond the allocated amount. This may, probabilistically speaking, be expected for a small proportion of the time window of interest. For example, for r=97.5% over a 12-month window, it is expected that the demand exceeds $\mathcal{P}_r$ for 219 hours over the 12-month window. As shown in FIG. 4, during such periods where demand exceeds proactively allocated capacity, additional computing resources may be reactively allocated to increase the capacity or capabilities of computing resource service provider 404. Reactive measures may include throttling or queuing user requests to a rate that computing resource service provider 404 is able to handle. In some cases, computing resource dedicated to one portion of computing resource service provider may be re-allocated to meet the demands of another portion of the computing resource service provider. In some cases, reactive measures include the procurement of additional computer hardware, such as adding additional servers to a data center. Once a period of extremely high demand passes, the reactively allocated resources may be de-allocated, for example, as described below in connection with FIG. 5.

Figure 5:
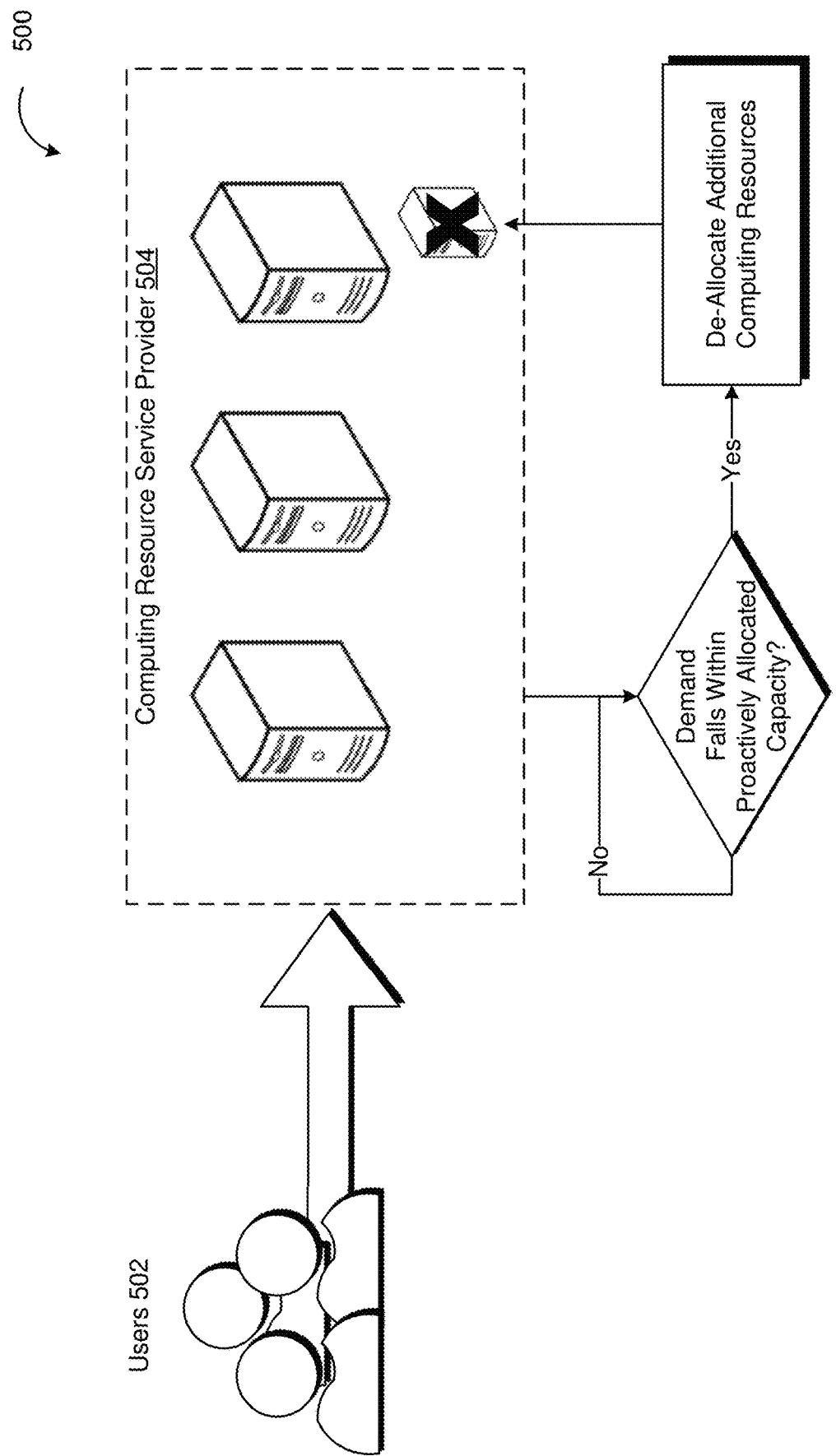
FIG. 5 illustrates a computing environment in which computing resources are de-allocated in response to user demand falling within a level that can be handled by an amount of proactively allocated computing resources estimated by a machine learning model for capacity planning using quantile regression and Monte-Carlo sampling of innovations, in accordance with one or more example embodiments of the present disclosure.

FIG. 5 illustrates a computing environment 500 in which computing resources are de-allocated in response to user demand falling within a level that can be handled by an amount of proactively allocated computing resources estimated by a machine learning model for capacity planning using quantile regression and Monte-Carlo sampling of innovations, in accordance with one or more example embodiments of the present disclosure. As shown in FIG. 5 and in relative relation to FIG. 4, users 502 may refer to computing clients of computing resource service provider 504. In various embodiments, additional computing resources may be reactively allocated in response to demand exceeding an amount of computing resources that was proactively allocated based on an estimated future demand percentile determined by a machine learning model for capacity planning using quantile regression and Monte-Carlo sampling of innovations, for example, discussed above in relation to FIG. 1. The additional computing resources may be allocated, as shown in FIG. 4, in order to accommodate users' demand for computing resources in computing resource service provider that exceeds the proactively allocated amount. However, users' demands may eventually fall within levels that can be accommodated by the proactively allocated capacity. In response to making such a determination, the additional computing resources may be de-allocated, de-provisioned, or otherwise made available to others' so that computing resource service provider 504 once again has capacity equal to the estimated future demand percentile.

FIG. 6 illustrates a diagram 600 that compares accuracy of various models using synthetic data sets, in accordance with at least one embodiment. The accuracy of models using various techniques described herein to estimate $\mathcal{P}_r$ may be compared to the alternatives using techniques described in connection with FIG. 6. Consider four different methods over two dimensions: ARIMA with least squares vs. ARIMA with quantile regression; and using Monte-Carlo sampling vs. not. Examples results for synthetic data sets are presented in FIG. 6.

For the sake of the consistency across the experiment, the threshold is fixed at r=97.5%, i.e., examining how close $\mathcal{P}_r$ is to the 97.5$^{th}$ percentile of the data. This choice makes it relatively easy to compute $\mathcal{P}_r$ for a normal distribution because it is just 2σ above the mean of the distribution. Again, notice that the point-to-point fluctuations for Capacity Planning purposes are of no concern so long as the premise is satisfied.

In at least one embodiment, synthetic data to test a machine learning model described herein is generated according to or based on the following techniques: generate 1000 independent sets of synthetic data of length 2000 using ARIMA(3, 2) with parameters φ=[0.3, −0.2, 0.4], θ=[−0.2, 0.1] and σ=1.0. For each set, the first 1000 points may be used for training and the second 1000 data points may be used for testing. For each set of synthetic data and each modeling method, $\mathcal{P}_r$ may be estimated and the count of data points from the test data that fall under this value recorded. With the length of the test data is 1000, and if r=97.5%, then 975 test points will be expected to fall under $\widehat{\mathcal{P}_r}$ and 25 fall above. Thus, the models may be tested against the ideal number of 975.

For each data set, four different parameter estimation methods (via two-step regression or conditional maximum likelihood; and via least squares and quantile regression), and, two different inference/forecasting methods (with Monte-Carlo simulation of innovations and without). FIG. 3 illustrates an inference/forecasting without Monte-Carlo simulation. In this case $\widehat{\mathcal{P}_r}_r$ is computed by adding $2\hat{\sigma}$ to the model forecast. In contrast, FIG. 4 depicts an inference/forecasting using Monte-Carlo simulation of the innovations. In this case, after forecasting, the sample 97.5$^{th}$ percentile is computed and count that as $\widehat{\mathcal{P}_r}_r$.

FIG. 6 show the box plot of the number of test data points falling under the estimated $\widehat{\mathcal{P}_r}_r$ for two-step regression and conditional maximum likelihood respectively against the ideal number 975 (horizontal line shown in FIG. 6). As shown in FIG. 6, forecasting without sampling tends to under-estimate $\widehat{\mathcal{P}_r}_r$. Furthermore, in both cases, using standard ARMA with sampling over-estimates the $\widehat{\mathcal{P}_r}_r$. In contrast, the approach using both quantile regression and Monte-Carlo sampling had a 3$^{rd}$ quartile above the optimal number and 1$^{st}$ quartile below the optimal number. In some embodiments, the average of the 1$^{st}$ and 3$^{rd}$ quartiles is selected as the estimator for $\mathcal{P}_r$. In various cases, the medium may over-estimate $\mathcal{P}_r$ and averaging the 1$^{st}$ and 3$^{rd}$ quartiles may generate better results. Furthermore, the results of the conditional maximum likelihood may be closer to the ideal point 975. Given the higher computational complexity of the conditional maximum likelihood versus the two-step regression, one might decide to choose one over the other based on the trade-offs.

Figure 7:
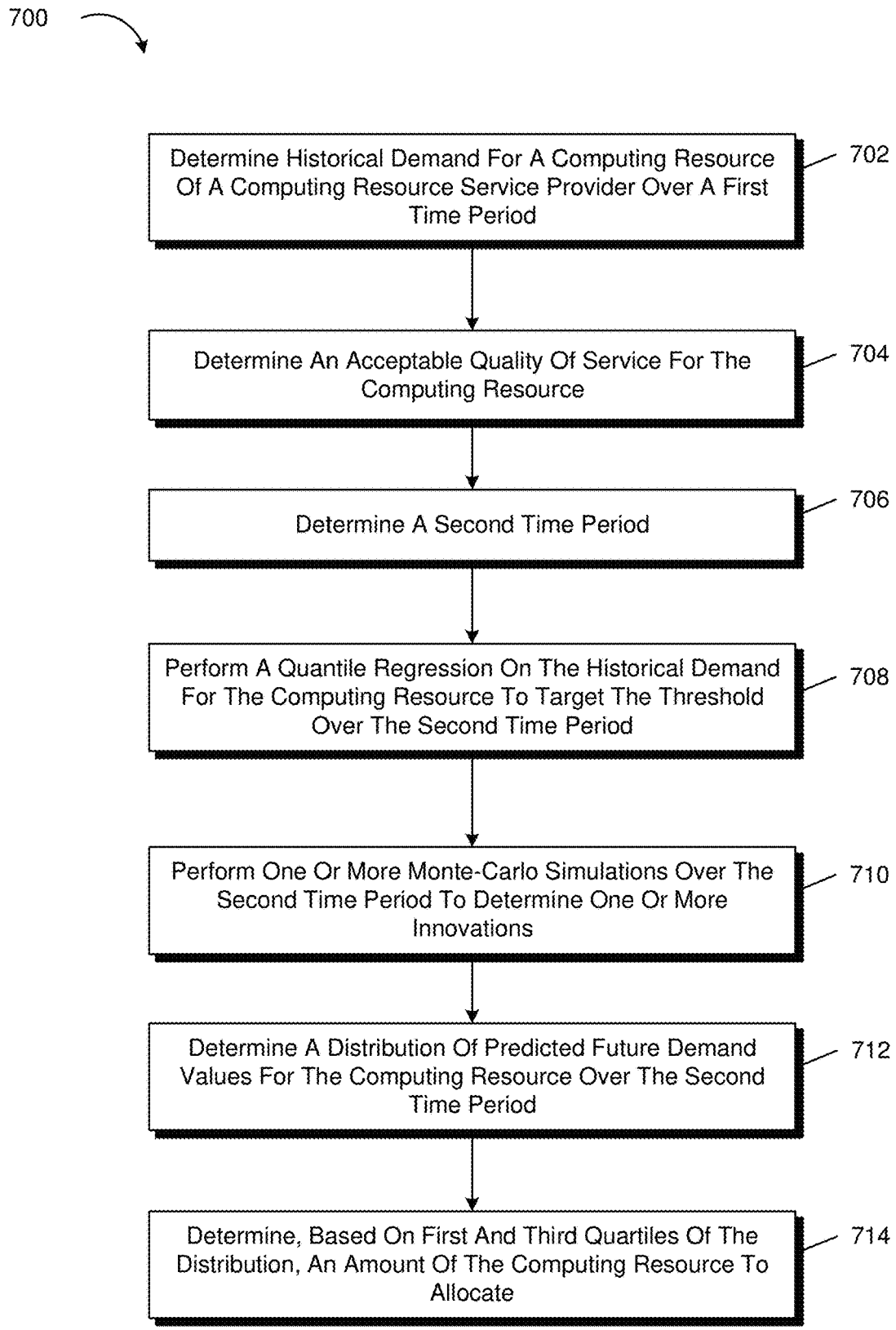
FIG. 7 shows an illustrative example of a process for capacity planning using quantile regression, in accordance with one or more example embodiments of the present disclosure.

FIG. 7 shows an illustrative example of a process 700 for capacity planning using quantile regression, in accordance with one or more example embodiments of the present disclosure. In at least one embodiment, some or all of the process 700 (or any other processes described herein, or variations and/or combinations thereof) is performed under the control of one or more computer systems that store computer-executable instructions and may be implemented as code (e.g., computer-executable instructions, one or more computer programs, or one or more applications) executing collectively on one or more processors, by hardware, software, or combinations thereof. The code, in at least one embodiment, is stored on a computer-readable storage medium in the form of a computer program comprising a plurality of computer-readable instructions executable by one or more processors. The computer-readable storage medium, in at least one embodiment, is a non-transitory computer-readable medium. In at least one embodiment, at least some of the computer-readable instructions usable to perform the process 700 are not stored solely using transitory signals (e.g., a propagating transient electric or electromagnetic transmission). A non-transitory computer-readable medium does not necessarily include non-transitory data storage circuitry (e.g., buffers, caches, and queues) within transceivers of transitory signals. Process 700 may be implemented in the context of various systems and methods described elsewhere in this disclosure, such as those discussed in connection with FIGS. 1 and 8. In at least one embodiment, process 700 or a portion thereof is implemented by a computing resource service provider. A system that performs process 700 may include one or more machines, such as those described in connection with FIG. 8.

In at least one embodiment, process 700 illustrates a process for training and/or inferencing using an ARIMA-based machine learning model. In at least one embodiment, a model is trained using real or synthetic data sets where a data set is partitioned into a training data and a test data set. These data sets may be mutually exclusive. A training data set may be used to train the model to produce one or more parameters, such as those described in connection with FIG. 1, and a test data set may be used to test the model, determine accuracy, and iteratively update the one or more parameters of the model to improve accuracy. In various embodiments, a time series (e.g., historical or synthetic) may be partitioned so that the time series $x_i^n$ is included in a training data set and subsequent time series $x_{n+1}^{n+n_e}$ is included in the test data set to determine how n+1 accurately a model being trained on time series $x_i^n$ is able to forecast the subsequent demand which is known, but withheld, during training.

In at least one embodiment, a system performing at least part of process 700 stores, in memory, executable instructions that, as a result of execution by one or more processors of the system to determine 702 historical demand for a computing resource of a computing resource service provider over a first time period. Demand data for a first period may include demand recorded over a first time window (1, n) which precedes a second time window ($n_s$ to $n_e$). The two time windows may be contiguous, but are not required to do so. Demand data for the first period may serve as an input to a model for training and/or inferencing. The demand data may correspond to demand for a computing resource, such as network, storage, or compute resources. For example, the demand data may correspond to the total amount of data that was utilized by a user or service over the first time window (which may increase or decrease based on the creation of new data, deletion of existing data, etc.), the rate of disk/storage operations utilized over the first time window, or other various storage related metrics. The demand data can capture different measurements which can be used to allocate different resources. For example, the total amount of data that is utilized by a user may be used to determine how allocate an amount of storage space on a data storage service, and the peakiness of the user's access (e.g., whether the user makes a steady rate of requests or periods of low request volume mixed with high request volume) may be used to determine how much caching resources to allocate. Non-limiting examples of the demand data may include amounts or rates of compute resources, memory, network bandwidth, data storage capacity and/or throughput, security-related operation that involve the use of dedicated security modules such as hardware security module (HSM), and more. In some embodiment, the number of users (e.g., viewers or subscribers) may be recorded by the model to estimate how many users a service should expect over the second time window. This may be used to proactively allocate network resources or to perform additional steps to help increase the number of expected users of the service. While FIG. 7 illustrates determining historical demand data for a computing resource, synthetic demand data may be generated and used in various embodiments, such as embodiments where an ARIMA-based model is being trained. A training data set may comprise historical data, synthetic data, or a combination thereof.

In at least one embodiment, a system performing at least part of process 700 stores, in memory, executable instructions that, as a result of execution by one or more processors of the system to determine 704 an acceptable quality of service for the computing resource. The acceptable quality of service may be a threshold percentage of time which the forecasted demand should be satisfied. For example, the threshold may refer to an r value where the empirical $r^{th}$ percentile may imply that there is a 1−r probability that demand exceeds capacity. For example, planning for $97.5^{th}$ percentile over a time interval may imply a statistical probability that capacity will exceed demand roughly 2.5% of the time interval. The acceptable quality of service may refer to a probability, percentage, quality of service, or other suitable metric for determining capacity planning metrics. The acceptable quality of service may be a predetermined value. The acceptable quality of service may be an input variable that is specified when the machine learning model is trained. The acceptable quality of service may be determined empirically and provided by a user to the system.

In at least one embodiment, a system performing at least part of process 700 stores, in memory, executable instructions that, as a result of execution by one or more processors of the system to determine 706 a second time period. The second time period may refer to a second time window ($n_s$ to $n_e$) that follows a first time window (1, n) for which data is available (e.g., historical or synthetic demand for computing resources). In some embodiments, the second time window and first time window are non-contiguous (e.g., n≠$n_s$). In some embodiments, demand data for the second time window is known but withheld from the model during training. In some embodiments, the second time period is a time interval in the future for which the actual demand is unknown and unknowable ahead of time.

In at least one embodiment, a system performing at least part of process 700 stores, in memory, executable instructions that, as a result of execution by one or more processors of the system to perform 708 a quantile regression on the historical demand for the computing resource to target the threshold over the second time period. Quantile regression may refer to a method that can be utilized to target a desired percentile (e.g., the threshold) of a random variable, as opposed to $50^{th}$ percentile with least squares. In at least one embodiment, the objective function for quantile regression is:

$$\min_{\phi,\theta} \sum_{i=\max(p,q)}^{n} \rho_r \left( x_i - \sum_{j=1}^{p} \phi_j x_{i-j} - \sum_{k=1}^{q} \theta_k x_{i-k} \right)$$

where $\rho_r(\sim)$ is defined as $$\rho_r(z)=(1-r)\max(z, 0)+r \max(-z, 0)$$

An objective function may also be referred to as a loss function, in some cases. A suitable objective may be minimized, maximized, or otherwise optimized in any suitable manner. In at least one embodiment, an iterative process such as gradient descent is utilized to minimize objective for quantile regression. In at least one embodiment, this minimization converges to the point where a threshold proportion or percentage (e.g., r percentile) of the error mass falls below and the remainder (e.g., 1−r percentile) of the error falls above it. In various embodiments, determining the one or more innovations comprises forecasting one or more innovations over the second time window.

In at least one embodiment, the set of parameters includes $\phi$, $\theta$ and $\sigma$ as described above. $\phi$ may refer to one or more parameters of the auto regressive component of the model, $\theta$ may refer to one or more parameters of the moving average component of the model, and a may refer to the standard deviation of the model's residuals. In some embodiments, the set of parameters includes parameters that capture seasonal periodicity, which may be in accordance with SARIMA-based models described above. The set of parameters may refer to the set of parameters that minimizes the objective function, but is not strictly required to do so. For example, a set of parameters that approximately minimizes the objective function may be utilized for performance reasons, in at least one embodiment.

In at least one embodiment, a system performing at least part of process 700 stores, in memory, executable instructions that, as a result of execution by one or more processors of the system to perform 710 one or more Monte-Carlo simulations over the second time period to determine one or more innovations. In various embodiments, innovations $u_i$'s are unobserved over the first time window. Innovations are simulated based on an estimated variance $\hat{\sigma}^2$. In at least one embodiment, one or more innovations are iteratively forecasted using one or more Monte-Carlo simulations in the following manner: first forecast is for one step into the future, then get a sample from the normal distribution with estimated $\hat{\sigma}$ and add it to the forecast assuming full knowledge of the innovation $u_i$, and then iteratively continuing the forecasting process, one step at a time, as explained to reach $n_e$. One can repeat this whole process multiple times to get a better estimate of $\rho_r$ over the simulated time series.

In at least one embodiment, a system performing at least part of process 700 stores, in memory, executable instructions that, as a result of execution by one or more processors of the system to determine 712, based on the set of parameters and the one or more innovations, a distribution of predicted future demand values for the computing resource over the second time period. The distribution may be estimated of $\rho_r$'s obtained based on part on Monte-Carlo sampling, as described above in greater detail.

In at least one embodiment, a system performing at least part of process 700 stores, in memory, executable instructions that, as a result of execution by one or more processors of the system to determine 714, based on first and third quartiles of the distribution, an amount of the computing resource to allocate. This amount may correspond to an amount of the computing resource that is predicted to satisfy the acceptable quality of service over the second time period. In some embodiments, the distribution values include forecast ARIMA time series for $n_e$−n steps and computing $\rho_r$ of $\rho_r$ or $x_i$ for $i \in \{n_s, \ldots, n_e\}$ over K simulations, for example, in the manner described above in connection with FIG. 1. $\rho_r$'s are aggregated and sorted to determine a predicted capacity value, according to at least one embodiment. For example, the first and third quartiles of the $\rho_r$'s corresponding to the 25$^{th}$ and 75$^{th}$ percentiles may be averaged to determine the predicted capacity value. However, in other embodiments the predicted value may be determined, for example, by determining a first value associated with a first quartile below the median of $\rho_r$'s and a second value associated with a second quartile above the median of $\rho_r$'s and averaging them. Other suitable techniques for predicting an output based on a distribution of $\rho_r$'s is contemplated within the scope of this disclosure—for example, using the median as the value, using two values that are both above or below the median, and so on.

In various embodiments, the value that is sufficient to satisfy the threshold refers to an amount of computing resources that meets a specified quality of service. For example, the threshold may refer to r=97.5%, meaning that the value, in this example embodiment, refers to an amount of computing resources that would be sufficient to meet the predicted demand for the computing resource 97.5% of the time over the second time window. In at least one embodiment, the value is used to determine how much computing resources (e.g., servers, memory, data storage, network bandwidth) to proactively allocate to meet the forecasted future demand. Proactive measures may include procurement of computing resources such as hardware servers, data storage devices, electromagnetic spectrum, network routers, network bandwidth, and more.

In various embodiments, reactive measures may be utilized to further increase available computing resources in a computing resource service provider to meet demand that exceeds the threshold that exceeds an amount of computing resources sufficient to meet the threshold, in the computing resource service provider. For example, for r=97.5% over a 12-month time interval, demand is probabilistically expected to be exceed the forecasted capacity 2.5% of the time, which is approximately equal to 219 hours over the course of a 8,760-hour year. Reactive measures may be taken to increase capacity of the computing resources service provider during those 219 hours. For example, if the computing resource service provider detects that customer demand for computing resource exceeds the amount proactively allocated, then reactive measures may be taken to allocate one or more additional computing resource. In various cases, proactive measures are generally less limited than reactive measures, which may be more costly and/or limited. Reactive measures may include queueing or throttling of the rate of incoming client requests to a computing resource service provider. In some embodiments, a computing resource service provider may be able to scale up additional resources or re-allocate resources from elsewhere in a data center to handle the increased demand for computing resources, but may be limited by the total amount of computing resources available within the computing resource service provider.

The examples presented herein are not meant to be limiting.

Figure 8:
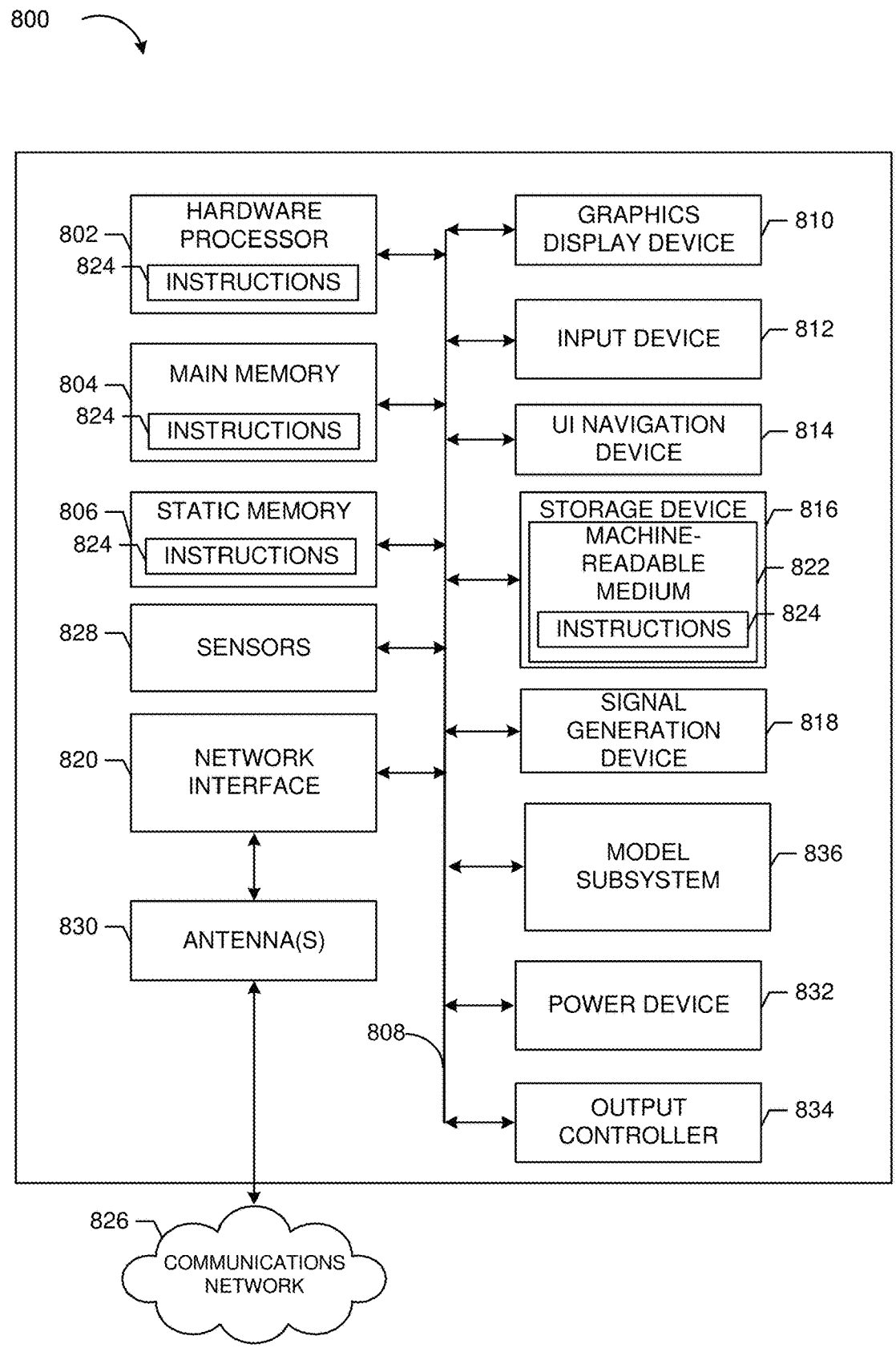
FIG. 8 illustrates a block diagram of an example machine upon which any of one or more techniques (e.g., methods) may be performed, in accordance with one or more example embodiments of the present disclosure.

FIG. 8 illustrates a block diagram of an example of a machine 800 (e.g., implemented in whole or in part in the context of embodiments described in connection with other figures). In some embodiments, the machine 800 may operate as a standalone device or may be connected (e.g., networked) to other machines. In a networked deployment, the machine 800 may operate in the capacity of a server machine, a client machine, or both in server-client network environments. In an example, the machine 800 may act as a peer machine in Wi-Fi direct, peer-to-peer (P2P) (or other distributed) network environments. The machine 800 may be a wearable device or any machine capable of executing instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein, such as cloud computing, software as a service (SaaS), or other computer cluster configurations.

Examples, as described herein, may include or may operate on logic or a number of components, modules, or mechanisms. Modules are tangible entities (e.g., hardware) capable of performing specified operations when operating. A module includes hardware. In an example, the hardware may be specifically configured to carry out a specific operation (e.g., hardwired). In another example, the hardware may include configurable execution units (e.g., transistors, circuits, etc.) and a computer readable medium containing instructions where the instructions configure the execution units to carry out a specific operation when in operation. The configuring may occur under the direction of the executions units or a loading mechanism. Accordingly, the execution units are communicatively coupled to the computer-readable medium when the device is operating. In this example, the execution units may be a member of more than one module. For example, under operation, the execution units may be configured by a first set of instructions to implement a first module at one point in time and reconfigured by a second set of instructions to implement a second module at a second point in time.

The machine (e.g., computer system) 800 may include any combination of the illustrated components. For example, the machine 800 may include a hardware processor 802 (e.g., a central processing unit (CPU), a graphics processing unit (GPU), a hardware processor core, or any combination thereof), a main memory 804 and a static memory 806, some or all of which may communicate with each other via an interlink (e.g., bus) 808. The machine 800 may further include a power management device 832, a graphics display device 810, an alphanumeric input device 812 (e.g., a keyboard), and a user interface (UI) navigation device 814 (e.g., a mouse). In an example, the graphics display device 810, alphanumeric input device 812, and UI navigation device 814 may be a touch screen display. The machine 800 may additionally include a storage device (e.g., drive unit) 816, a signal generation device 818, and a network interface device/transceiver 820 coupled to antenna(s) 830. The machine 800 may include an output controller 834, such as a serial (e.g., universal serial bus (USB), parallel, or other wired or wireless (e.g., infrared (IR), near field communication (NFC), etc.) connection to communicate with or control one or more peripheral devices (e.g., a printer, a card reader, other sensors, etc.)).

The storage device 816 may include a machine readable medium 822 on which is stored one or more sets of data structures or instructions 824 (e.g., software) embodying or utilized by any one or more of the techniques or functions described herein. The instructions 824 may also reside, completely or at least partially, within the main memory 804, within the static memory 806, or within the hardware processor 802 during execution thereof by the machine 800. In an example, one or any combination of the hardware processor 802, the main memory 804, the static memory 806, or the storage device 816 may constitute machine-readable media.

While the machine-readable medium 822 is illustrated as a single medium, the term "machine-readable medium" may include a single medium or multiple media (e.g., a centralized or distributed database, and/or associated caches and servers) configured to store the one or more instructions 824.

Various embodiments may be implemented fully or partially in software and/or firmware. This software and/or firmware may take the form of instructions contained in or on a non-transitory computer-readable storage medium. Those instructions may then be read and executed by one or more processors to enable performance of the operations described herein. The instructions may be in any suitable form, such as but not limited to source code, compiled code, interpreted code, executable code, static code, dynamic code, and the like. Such a computer-readable medium may include any tangible non-transitory medium for storing information in a form readable by one or more computers, such as but not limited to read only memory (ROM); random access memory (RAM); magnetic disk storage media; optical storage media; a flash memory, etc.

The term "machine-readable medium" may include any medium that is capable of storing, encoding, or carrying instructions for execution by the machine 800 and that cause the machine 800 to perform any one or more of the techniques of the present disclosure, or that is capable of storing, encoding, or carrying data structures used by or associated with such instructions. Non-limiting machine-readable medium examples may include solid-state memories and optical and magnetic media. In an example, a massed machine-readable medium includes a machine-readable medium with a plurality of particles having resting mass. Specific examples of massed machine-readable media may include non-volatile memory, such as semiconductor memory devices (e.g., electrically programmable read-only memory (EPROM), or electrically erasable programmable read-only memory (EEPROM)) and flash memory devices; magnetic disks, such as internal hard disks and removable disks; magneto-optical disks; and CD-ROM and DVD-ROM disks.

The instructions 824 may further be transmitted or received over a communications network 826 using a transmission medium via the network interface device/transceiver 820 utilizing any one of a number of transfer protocols (e.g., frame relay, internet protocol (IP), transmission control protocol (TCP), user datagram protocol (UDP), hypertext transfer protocol (HTTP), etc.). Example communications networks may include a local area network (LAN), a wide area network (WAN), a packet data network (e.g., the Internet), mobile telephone networks (e.g., cellular networks), plain old telephone (POTS) networks, wireless data networks (e.g., Institute of Electrical and Electronics Engineers (IEEE) 802.11 family of standards known as Wi-Fi®, IEEE 802.16 family of standards known as WiMax®), IEEE 802.15.4 family of standards, and peer-to-peer (P2P) networks, among others. In an example, the network interface device/transceiver 820 may include one or more physical jacks (e.g., Ethernet, coaxial, or phone jacks) or one or more antennas to connect to the communications network 826. In an example, the network interface device/transceiver 820 may include a plurality of antennas to wirelessly communicate using at least one of single-input multiple-output (SIMO), multiple-input multiple-output (MIMO), or multiple-input single-output (MISO) techniques. The term "transmission medium" shall be taken to include any intangible medium that is capable of storing, encoding, or carrying instructions for execution by the machine 800 and includes digital or analog communications signals or other intangible media to facilitate communication of such software.

Model subsystem 836 may refer to software and/or hardware that includes executable instructions that, as a result of execution by processor 802, implements functionality described here, such as processes or systems to train and/or inference using an ARIMA-based model. In various embodiments, subsystem 836 generates, for example, via training, a machine learning model for capacity planning using quantile regression and/or Monte-Carlo simulation of innovations. In at least one embodiment, model subsystem 836 perform at least part of a process in accordance with FIG. 7.

The operations and processes described and shown above may be carried out or performed in any suitable order as desired in various implementations. Additionally, in certain implementations, at least a portion of the operations may be carried out in parallel. Furthermore, in certain implementations, less than or more than the operations described may be performed.

The word "exemplary" is used herein to mean "serving as an example, instance, or illustration." Any embodiment described herein as "exemplary" is not necessarily to be construed as preferred or advantageous over other embodiments. The terms "computing device," "user device," "communication station," "station," "handheld device," "mobile device," "wireless device" and "user equipment" (UE) as used herein refers to a wireless communication device such as a cellular telephone, a smartphone, a tablet, a netbook, a wireless terminal, a laptop computer, a femtocell, a high data rate (HDR) subscriber station, an access point, a printer, a point of sale device, an access terminal, or other personal communication system (PCS) device. The device may be either mobile or stationary.

As used within this document, the term "communicate" is intended to include transmitting, or receiving, or both transmitting and receiving. This may be particularly useful in claims when describing the organization of data that is being transmitted by one device and received by another, but only the functionality of one of those devices is required to infringe the claim. Similarly, the bidirectional exchange of data between two devices (both devices transmit and receive during the exchange) may be described as "communicating," when only the functionality of one of those devices is being claimed. The term "communicating" as used herein with respect to a wireless communication signal includes transmitting the wireless communication signal and/or receiving the wireless communication signal. For example, a wireless communication unit, which is capable of communicating a wireless communication signal, may include a wireless transmitter to transmit the wireless communication signal to at least one other wireless communication unit, and/or a wireless communication receiver to receive the wireless communication signal from at least one other wireless communication unit.

As used herein, unless otherwise specified, the use of the ordinal adjectives "first," "second," "third," etc., to describe a common object, merely indicates that different instances of like objects are being referred to and are not intended to imply that the objects so described must be in a given sequence, either temporally, spatially, in ranking, or in any other manner.

Some embodiments may be used in conjunction with various devices and systems, for example, a personal computer (PC), a desktop computer, a mobile computer, a laptop computer, a notebook computer, a tablet computer, a server computer, a handheld computer, a handheld device, a personal digital assistant (PDA) device, a handheld PDA device, an on-board device, an off-board device, a hybrid device, a vehicular device, a non-vehicular device, a mobile or portable device, a consumer device, a non-mobile or non-portable device, a wireless communication station, a wireless communication device, a wireless access point (AP), a wired or wireless router, a wired or wireless modem, a video device, an audio device, an audio-video (A/V) device, a wired or wireless network, a wireless area network, a wireless video area network (WVAN), a local area network (LAN), a wireless LAN (WLAN), a personal area network (PAN), a wireless PAN (WPAN), and the like.

Some embodiments may be used in conjunction with one way and/or two-way radio communication systems, biomedical sensors, wearable devices or sensors, cellular radio-telephone communication systems, a mobile phone, a cellular telephone, a wireless telephone, a personal communication system (PCS) device, a PDA device which incorporates a wireless communication device, a mobile or portable global positioning system (GPS) device, a device which incorporates a GPS receiver or transceiver or chip, a device which incorporates an RFID element or chip, a multiple input multiple output (MIMO) transceiver or device, a single input multiple output (SIMO) transceiver or device, a multiple input single output (MISO) transceiver or device, a device having one or more internal antennas and/or external antennas, digital video broadcast (DVB) devices or systems, multi-standard radio devices or systems, a wired or wireless handheld device, e.g., a smartphone, a wireless application protocol (WAP) device, or the like.

Some embodiments may be used in conjunction with one or more types of wireless communication signals and/or systems following one or more wireless communication protocols, for example, radio frequency (RF), infrared (IR), frequency-division multiplexing (FDM), orthogonal FDM (OFDM), time-division multiplexing (TDM), time-division multiple access (TDMA), extended TDMA (E-TDMA), general packet radio service (GPRS), extended GPRS, code-division multiple access (CDMA), wideband CDMA (WCDMA), CDMA 2000, single-carrier CDMA, multi-carrier CDMA, multi-carrier modulation (MDM), discrete multi-tone (DMT), Bluetooth®, global positioning system (GPS), Wi-Fi, Wi-Max, ZigBee, ultra-wideband (UWB), global system for mobile communications (GSM), 2G, 2.5G, 3G, 3.5G, 4G, fifth generation (5G) mobile networks, 3GPP, long term evolution (LTE), LTE advanced, enhanced data rates for GSM Evolution (EDGE), or the like. Other embodiments may be used in various other devices, systems, and/or networks.

It is understood that the above descriptions are for purposes of illustration and are not meant to be limiting.

Although specific embodiments of the disclosure have been described, one of ordinary skill in the art will recognize that numerous other modifications and alternative embodiments are within the scope of the disclosure. For example, any of the functionality and/or processing capabilities described with respect to a particular device or component may be performed by any other device or component. Further, while various illustrative implementations and architectures have been described in accordance with embodiments of the disclosure, one of ordinary skill in the art will appreciate that numerous other modifications to the illustrative implementations and architectures described herein are also within the scope of this disclosure.

Program module(s), applications, or the like disclosed herein may include one or more software components including, for example, software objects, methods, data structures, or the like. Each such software component may include computer-executable instructions that, responsive to execution, cause at least a portion of the functionality described herein (e.g., one or more operations of the illustrative methods described herein) to be performed.

A software component may be coded in any of a variety of programming languages. An illustrative programming language may be a lower-level programming language such as an assembly language associated with a particular hardware architecture and/or operating system platform. A software component comprising assembly language instructions may require conversion into executable machine code by an assembler prior to execution by the hardware architecture and/or platform.

Another example programming language may be a higher-level programming language that may be portable across multiple architectures. A software component comprising higher-level programming language instructions may require conversion to an intermediate representation by an interpreter or a compiler prior to execution.

Other examples of programming languages include, but are not limited to, a macro language, a shell or command language, a job control language, a script language, a database query or search language, or a report writing language. In one or more example embodiments, a software component comprising instructions in one of the foregoing examples of programming languages may be executed directly by an operating system or other software component without having to be first transformed into another form.

A software component may be stored as a file or other data storage construct. Software components of a similar type or functionally related may be stored together such as, for example, in a particular directory, folder, or library. Software components may be static (e.g., pre-established or fixed) or dynamic (e.g., created or modified at the time of execution).

Software components may invoke or be invoked by other software components through any of a wide variety of mechanisms. Invoked or invoking software components may comprise other custom-developed application software, operating system functionality (e.g., device drivers, data storage (e.g., file management) routines, other common routines and services, etc.), or third-party software components (e.g., middleware, encryption, or other security software, database management software, file transfer or other network communication software, mathematical or statistical software, image processing software, and format translation software).

Software components associated with a particular solution or system may reside and be executed on a single platform or may be distributed across multiple platforms. The multiple platforms may be associated with more than one hardware vendor, underlying chip technology, or operating system. Furthermore, software components associated with a particular solution or system may be initially written in one or more programming languages, but may invoke software components written in another programming language.

Computer-executable program instructions may be loaded onto a special-purpose computer or other particular machine, a processor, or other programmable data processing apparatus to produce a particular machine, such that execution of the instructions on the computer, processor, or other programmable data processing apparatus causes one or more functions or operations specified in any applicable flow diagrams to be performed. These computer program instructions may also be stored in a computer-readable storage medium (CRSM) that upon execution may direct a computer or other programmable data processing apparatus to function in a particular manner, such that the instructions stored in the computer-readable storage medium produce an article of manufacture including instruction means that implement one or more functions or operations specified in any flow diagrams. The computer program instructions may also be loaded onto a computer or other programmable data processing apparatus to cause a series of operational elements or steps to be performed on the computer or other programmable apparatus to produce a computer-implemented process.

Additional types of CRSM that may be present in any of the devices described herein may include, but are not limited to, programmable random access memory (PRAM), SRAM, DRAM, RAM, ROM, electrically erasable programmable read-only memory (EEPROM), flash memory or other memory technology, compact disc read-only memory (CD-ROM), digital versatile disc (DVD) or other optical storage, magnetic cassettes, magnetic tape, magnetic disk storage or other magnetic storage devices, or any other medium which may be used to store the information and which may be accessed. Combinations of any of the above are also included within the scope of CRSM. Alternatively, computer-readable communication media (CRCM) may include computer-readable instructions, program module(s), or other data transmitted within a data signal, such as a carrier wave, or other transmission. However, as used herein, CRSM does not include CRCM.

Although embodiments have been described in language specific to structural features and/or methodological acts, it is to be understood that the disclosure is not necessarily limited to the specific features or acts described. Rather, the specific features and acts are disclosed as illustrative forms of implementing the embodiments. Conditional language, such as, among others, "can," "could," "might," or "may," unless specifically stated otherwise, or otherwise understood within the context as used, is generally intended to convey that certain embodiments could include, while other embodiments do not include, certain features, elements, and/or steps. Thus, such conditional language is not generally intended to imply that features, elements, and/or steps are in any way required for one or more embodiments or that one or more embodiments necessarily include logic for deciding, with or without user input or prompting, whether these features, elements, and/or steps are included or are to be performed in any particular embodiment.

What is claimed is:

1. A computer-implemented method, comprising:
    determining historical demand for a computing resource of a computing resource service provider over a first time period;
    determining an acceptable quality of service for the computing resource of the computing resource service provider;
    determining a second time period;
    performing a quantile regression on the historical demand for the computing resource to target the acceptable quality of service over the second time period;
    determining, based on the quantile regression, a set of parameters for a model that approximates the historic demand for the computing resource over the first time period;
    performing one or more Monte-Carlo simulations over the second time period to determine one or more innovations;

determining, based on the set of parameters and the one or more innovations, a distribution of predicted future demand values for the computing resource over the second time period;
determining a first quartile of the distribution;
determining a third quartile of the distribution;
determining, based on the first quartile and the third quartile, an amount of the computing resource that is predicted to satisfy the acceptable quality of service over the second time period; and
allocating one or more computing resources for the computing resource service provider to meet the amount of the computing resource that is predicted to satisfy the acceptable quality of service over the second time period.

2. The computer-implemented method of claim 1, wherein performing the one or more Monte-Carlo simulations comprises iteratively forecasting, for a plurality of steps over the second time period, samples from a normal distribution with a fixed innovation variance.

3. The computer-implemented method of claim 1, wherein the set of parameters comprises:
a first subset of the set of parameters that models an auto regressive component of the model; and
a second subset of the set of parameters that models a moving average component of the model.

4. The computer-implemented method of claim 1, further comprising:
determining, during the second time period that the one or more computing resources are insufficient to meet a rate of requests to the computing resource service provider; and
based at least in part on determining that the one or more computing resources are insufficient, allocating, within the computing resource service provider, one or more additional computing resources.

5. A computer-implemented method, comprising:
inferencing, using one or more machine learning models trained based on data for a first time interval to satisfy a threshold over a second time interval by at least:
performing a quantile regression on the data to target the threshold over the second time interval;
determining, based on the quantile regression, a set of parameters;
determining one or more innovations over the second time interval using a Monte-Carlo simulation;
forecasting, based on the set of parameters and the one or more innovations, a plurality of values; and
determining, based on the plurality of values, a value that satisfies the threshold.

6. The computer-implemented method of claim 5, wherein determining the value that satisfies the threshold comprises:
determining a first value for a first quantile of the plurality of values that falls below a median of the plurality of values;
determining a second value for a second quantile of the plurality of values that falls above the median of the plurality of values; and
computing the value based on the first value and the second value.

7. The computer-implemented method of claim 5, further comprising:
allocating, within a computing resource service provider, one or more computing resources based on the value that satisfies the threshold.

8. The computer-implemented method of claim 7, further comprising:
determining, based on a first rate of requests, that the one or more computing resources are insufficient; and
based at least in part on determining that the one or more computing resources are insufficient, allocating one or more additional computing resources.

9. The computer-implemented method of claim 8, further comprising:
determining, based on a second rate of requests, that the one or more computing resources are sufficient; and
de-allocating the one or more additional computing resources.

10. The computer-implemented method of claim 7, further comprising:
determining that the one or more computing resources are insufficient to meet a rate of requests to the computing resource service provider; and
queuing requests to match capacity of the one or more computing resources.

11. The computer-implemented method of claim 5, wherein the value that corresponds to an amount of computing resources to allocate to a user of a computing resource service provider over the second time interval.

12. The computer-implemented method of claim 5, wherein the value corresponds to an amount of users of a computing resource service provider.

13. A system, comprising:
one or more processors; and
memory storing executable instructions that, as a result of execution by the one or more processors, cause the system to:
train one or more machine learning models to predict, based on data set for a first time interval, an amount of computing resources to satisfy a threshold over a second time interval by at least:
performing a quantile regression on the data set to target the threshold over the second time interval;
determining, based on the quantile regression, a set of parameters that approximately models the data set;
determining, using one or more Monte Carlo simulations, one or more innovations over the second time interval;
forecasting, based on the set of parameters and the one or more innovations, a plurality of values; and
determining, based on the plurality of values, a value that satisfies the threshold.

14. The system of claim 13, wherein:
the plurality of values correspond to forecasted demand for computing resources; and
the threshold corresponds to a percentage of time which the forecasted demand is satisfied over the second time interval.

15. The system of claim 13, wherein the instructions include further instructions that, as a result of execution by the one or more processors, further cause the system to:
select a second set of parameters;
generate, based on the second set of parameters, a synthetic data set over at least the first time interval and the second time interval;
select a first portion of the synthetic data set for training;
select a second portion of the synthetic data set for testing;
provide the first portion of the synthetic data set as the data set; and
determine accuracy of the value based on the second portion of the synthetic data set.

16. The system of claim 13, wherein the instructions to determine the one or more innovations over the second time interval include instructions that, as a result of execution by the one or more processors, cause the system to:
  iteratively forecast a plurality of steps of the second time interval by sampling from a distribution.

17. The system of claim 13, wherein the value is a median of the plurality of values.

18. The system of claim 13, wherein the one or more machine learning models comprises an Auto Regressive Integrated Moving Average (ARIMA)-based model.

19. The system of claim 13, wherein the set of parameters includes one or more parameters with seasonal periodicity.

20. The system of claim 13, wherein the amount of computing resources corresponds to compute resources, memory, data storage capacity, or network bandwidth.

* * * * *